(12) United States Patent
Schloesser et al.

(10) Patent No.: US 10,172,286 B2
(45) Date of Patent: Jan. 8, 2019

(54) KNIFE ROLLS WITH DIFFERING LENGTHS

(71) Applicant: Oxbo International Corporation, Byron, NY (US)

(72) Inventors: Christopher M Schloesser, Hudson, WI (US); Mitchel Paulson, Blaine, MN (US)

(73) Assignee: Oxbo International Corporation, Byron, NY (US)

( * ) Notice: Subject to any disclaimer, the term of this patent is extended or adjusted under 35 U.S.C. 154(b) by 57 days.

(21) Appl. No.: 15/400,508

(22) Filed: Jan. 6, 2017

(65) Prior Publication Data

US 2017/0188517 A1    Jul. 6, 2017

Related U.S. Application Data

(60) Provisional application No. 62/275,543, filed on Jan. 6, 2016.

(51) Int. Cl.
  *A01D 45/02* (2006.01)
(52) U.S. Cl.
  CPC ......... *A01D 45/025* (2013.01); *A01D 45/023* (2013.01)
(58) Field of Classification Search
  CPC .............................. A01D 45/025; A01D 45/021
  USPC ........................................ 56/104, 103, 51, 52
  See application file for complete search history.

(56) References Cited

U.S. PATENT DOCUMENTS

| 1,641,436 A | 9/1927 | Jett |
|---|---|---|
| 1,682,143 A | 8/1928 | Deere |
| 1,894,412 A | 1/1933 | Neighbour |
| 2,178,013 A | 10/1939 | Blank |
| 2,456,404 A | 12/1948 | Good |
| 2,503,128 A | 4/1950 | Neighbour et al. |
| 2,534,685 A | 12/1950 | Shrader |
| 2,535,878 A | 12/1950 | Swenson |
| 2,538,965 A | 1/1951 | Fergason |
| 2,678,526 A | 5/1954 | Voss |
| 3,304,702 A | 2/1967 | Russell |
| 3,462,928 A | 8/1969 | Schreiner et al. |
| 3,858,384 A | 1/1975 | Maiste et al. |
| 3,982,385 A | 9/1976 | Hyman |
| 4,219,990 A | 9/1980 | Hill |
| 4,227,366 A | 10/1980 | Pucher |
| 4,233,804 A | 11/1980 | Fischer |
| 4,244,162 A | 1/1981 | Pucher |

(Continued)

FOREIGN PATENT DOCUMENTS

| DE | 3612224 | 10/1987 |
|---|---|---|
| EP | 1417877 | 5/2004 |

*Primary Examiner* — Arpad Fabian-Kovacs
(74) *Attorney, Agent, or Firm* — Merchant & Gould P.C.

(57) ABSTRACT

Stalk rolls are used for a corn harvester or combine having a chassis, an engine, a cab mounted to the chassis with a head mounted at the front of the body. The head includes an auger, row separators, corn stalk gathering assemblies between the row separators and ear removal assemblies. Each ear removal device includes a pair of stalk rolls. Each stalk roll has a core and longitudinally extending flutes about a periphery of the corn extending along the core. Each stalk roll has a straight first section and a tapered second section. The flutes on each stalk roll have different lengths and end at different locations at the front of the stalk roll. The flutes of the stalk roll may also have notches and different shaped leading edges.

16 Claims, 26 Drawing Sheets

(56) References Cited

U.S. PATENT DOCUMENTS

| | | |
|---|---|---|
| 4,807,645 A | 2/1989 | Mietzel et al. |
| 4,955,188 A | 9/1990 | Von Allworden |
| 5,009,061 A | 4/1991 | Heuling |
| 5,040,361 A | 8/1991 | Briesemeister |
| 5,269,126 A | 12/1993 | Kalverkamp |
| 5,282,352 A | 2/1994 | Schoolman |
| 5,404,699 A | 4/1995 | Christensen et al. |
| 5,451,184 A | 9/1995 | Mietzel |
| 5,784,869 A | 7/1998 | Rayfield |
| 5,865,019 A | 2/1999 | Hulburt et al. |
| 5,881,541 A | 3/1999 | Silver et al. |
| 5,881,542 A | 3/1999 | Togami et al. |
| 5,911,673 A | 6/1999 | Johnson |
| 5,913,803 A | 6/1999 | Moster |
| 5,916,113 A | 6/1999 | Johnson |
| 5,921,070 A | 7/1999 | Chamberlain |
| 5,927,054 A | 7/1999 | Chamberlain |
| 5,970,611 A | 10/1999 | Takabe et al. |
| 6,050,071 A | 4/2000 | Bich et al. |
| 6,116,005 A | 9/2000 | Chamberlain |
| 6,185,919 B1 | 2/2001 | Borchard |
| 6,216,428 B1 | 4/2001 | Becker et al. |
| 6,251,008 B1 | 6/2001 | Mietzel |
| 6,513,313 B1 | 2/2003 | Bennett |
| 6,936,294 B2 | 8/2005 | Matthews et al. |
| 7,047,717 B1 * | 5/2006 | Wolters ............... A01D 45/021 56/60 |
| 7,237,373 B2 | 7/2007 | Resing et al. |
| 7,373,767 B2 | 5/2008 | Calmer |
| 7,469,524 B2 | 12/2008 | Rieck et al. |
| 7,493,745 B2 | 2/2009 | Wubbles et al. |
| 7,886,510 B2 * | 2/2011 | Calmer ............... A01D 45/025 56/103 |
| 9,560,804 B1 * | 2/2017 | Calmer ............... A01D 45/025 |
| 2002/0014064 A1 | 2/2002 | Wubbels et al. |
| 2003/0104101 A1 | 6/2003 | Matthews et al. |
| 2003/0131576 A1 | 7/2003 | Wubbels |
| 2003/0172639 A1 | 9/2003 | Calmer |
| 2004/0016219 A1 | 1/2004 | Calmer |
| 2004/0123577 A1 | 7/2004 | Resing et al. |
| 2005/0120695 A1 | 6/2005 | Calmer |
| 2007/0180806 A1 | 8/2007 | Calmer |
| 2007/0193241 A1 | 8/2007 | Rieck et al. |
| 2007/0245906 A1 | 10/2007 | Gorlitz |
| 2007/0266689 A1 | 11/2007 | Calmer |
| 2008/0092507 A1 | 4/2008 | Bollig |
| 2009/0025353 A1 | 1/2009 | Christensen et al. |
| 2009/0249759 A1 * | 10/2009 | Calmer ............... A01D 45/025 56/62 |
| 2011/0047949 A1 | 3/2011 | Glazier et al. |
| 2014/0182255 A1 * | 7/2014 | Calmer ............... A01D 45/025 56/104 |
| 2014/0260164 A1 * | 9/2014 | Lohrentz ............... A01D 45/025 56/104 |
| 2016/0338268 A1 * | 11/2016 | Calmer ............... A01D 45/025 |
| 2017/0172067 A1 * | 6/2017 | Calmer ............... A01D 45/025 |

* cited by examiner

KNIFE ROLLS WITH DIFFERING LENGTHS

BACKGROUND OF THE INVENTION

Field of the Invention

The present invention is directed to improved stalk rolls as may be used with corn harvesters and combines, and in particular to a stalk roll with blades having different lengths to progressively feed corn stalks.

Prior Art

Corn harvesters and combines include headers with multiple row crop dividing assemblies for directing corn stalks into harvesting gaps defined between the dividing assemblies. Gathering chains or other devices in the gaps draw the corn stalk toward the header and move the corn cobs to the augers and conveyors. As the stalks are drawn toward the header, stalk rolls, also known as knife rolls, pull the stalks rapidly downward. Typically, plates are located above and adjacent the stalk rolls to separate the ears from the stalk and to prevent the ears of corn from passing between the plates and contacting the stalk rolls. The ears of corn are separated from the stalk and directed along a conveyor of the harvester or combine. It is generally desirable to maintain at least some of the stalks in the field for erosion control and to recycle the plant materials. Moreover, it is an advantage to chop up the stalks to aid in decomposition. Smaller pieces of chopped stalk also tend to eliminate or minimize plugging of tillage tools used in the field for subsequent operations.

A common problem with harvesters and combines is trash on the head and throughout the harvester or combine that can lead to plugging. This can be reduced by improving the feed and handling of stalks. Moreover, improved feeding along the stalk roll improves crushing and crimping of the stalks and conditions residue to reduce wind and water erosion. The improved conditioning also reduces plugging for fall tillage. Crushing and crimping treatment of stalks by the harvester or combine also improves field planting conditions. The stalk rolls should also work under a wide variety of stalk and harvesting conditions.

Typical stalk rolls include a core portion with flutes or blades mounted around the body of the roll, and a nose portion with a helical vane. Such a configuration may include a tapered portion at the leading edge of the stalk roll near the nose portion. Such a configuration has generally been effective at providing feeding through the head and harvester or combine. However, under certain conditions, the corn stalks do not enter into the pair of knives sufficiently. This may cause plugging and ineffective crimping or crushing that may lead to problems with the harvester or combine and in the field when the stalks are later engaged by other machinery. Moreover, to improve feeding, such stalk rolls are relatively long due to a taper and/or a longer impeller at the front of the stalk rolls, leading to larger and heavier heads on the harvesters and combines.

It can be seen that a new and improved harvester or combine, corn head, and stalk rolls are needed. Such a stalk roll should aid in providing feeding of the stalks through the corn head and improving the condition of the stalks remaining in the field. Moreover, such stalk rolls should allow the stalks to enter a sufficient distance between the knife rolls to aid in reducing plugging throughout the corn head and further in the harvester or combine. Such stalk rolls should improve feeding with a progressive entry while achieving a shorter more compact configuration. The present invention addresses these as well as other problems associated with harvesters or combines, corn heads, and stalk rolls.

SUMMARY OF THE INVENTION

The present invention is directed to stalk rolls for a corn harvester or combine. The harvester or combine includes a head having row separators that direct corn stalks to ear removal assemblies. An auger at the rear of the head directs ears to the conveyor and for a combine, to the threshing equipment for further processing.

The ear removal assembly includes a gathering assembly having belts or chains with paddles that engage the corn stalks and pull them rearward to and along stalk rolls, also known as knife rolls. The stalk rolls pull the corn stalks downward so the ears of corn are separated from the corn stalks as they pass between plates above the gathering assembly. Separated ears of corn are passed to an auger for further processing. The corn stalks are pulled downward where they are crimped and cut by the stalk rolls and remain in the fields for decomposition to improve treatment of the fields and soil. Each stalk roll includes an impellor at the leading end of the stalk roll. The stalk rolls are arranged in pairs and rotate in opposite directions to engage the corn stalks and pull the stalks downward between the stalk rolls. The impellor of each stalk roll includes a helical vane with the helical vanes extending in opposite directions. The stalk rolls include a substantially cylindrical body and flutes extending outward from a periphery of the cylindrical body at an oblique angle. The edges of the flutes form knives that cut and grip the corn stalks. Stalk rolls configuring with a tapering section tapering downward from the rear cylindrical portion towards the impellor.

The flutes of the present invention are configured so that each stalk roll includes flutes that have more than one length and/or configuration to create a progressive entry. In one embodiment, the flutes have two different lengths while in further embodiments, the flutes have three different lengths. The flutes generally start from the rear of the cylindrical portion of the stalk roll and extend forward and end along the tapered portion. Moreover, the leading edge of the stalk rolls may be configured with a point or with a substantially straight planar leading edge. Moreover, notches may be formed in the flutes and extending from the leading edge rearward along the outer surface of the cylindrical portion of each stalk roll.

In one embodiment, the stalk rolls include six flutes while in other embodiments, the stalk rolls each include eight flutes. The flutes are configured so that they intermesh with flutes of the opposite stalk roll of each pair. Moreover, the stalk rolls rotate in opposite directions and the flutes are angled in opposite directions on each pair of stalk rolls. The configuration of the flutes provides spacing for better progressive feeding, crimping and processing of the stalk rolls without plugging or clogging. Moreover, this is accomplished by utilizing stalk rolls of a shorter dimension than conventional stalk rolls achieving a more compact design and lighter weight head. Therefore, there are cost savings and performance advantages provided by the present invention.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the views.

DETAILED DESCRIPTION OF THE PREFERRED EMBODIMENT

Figure 1:
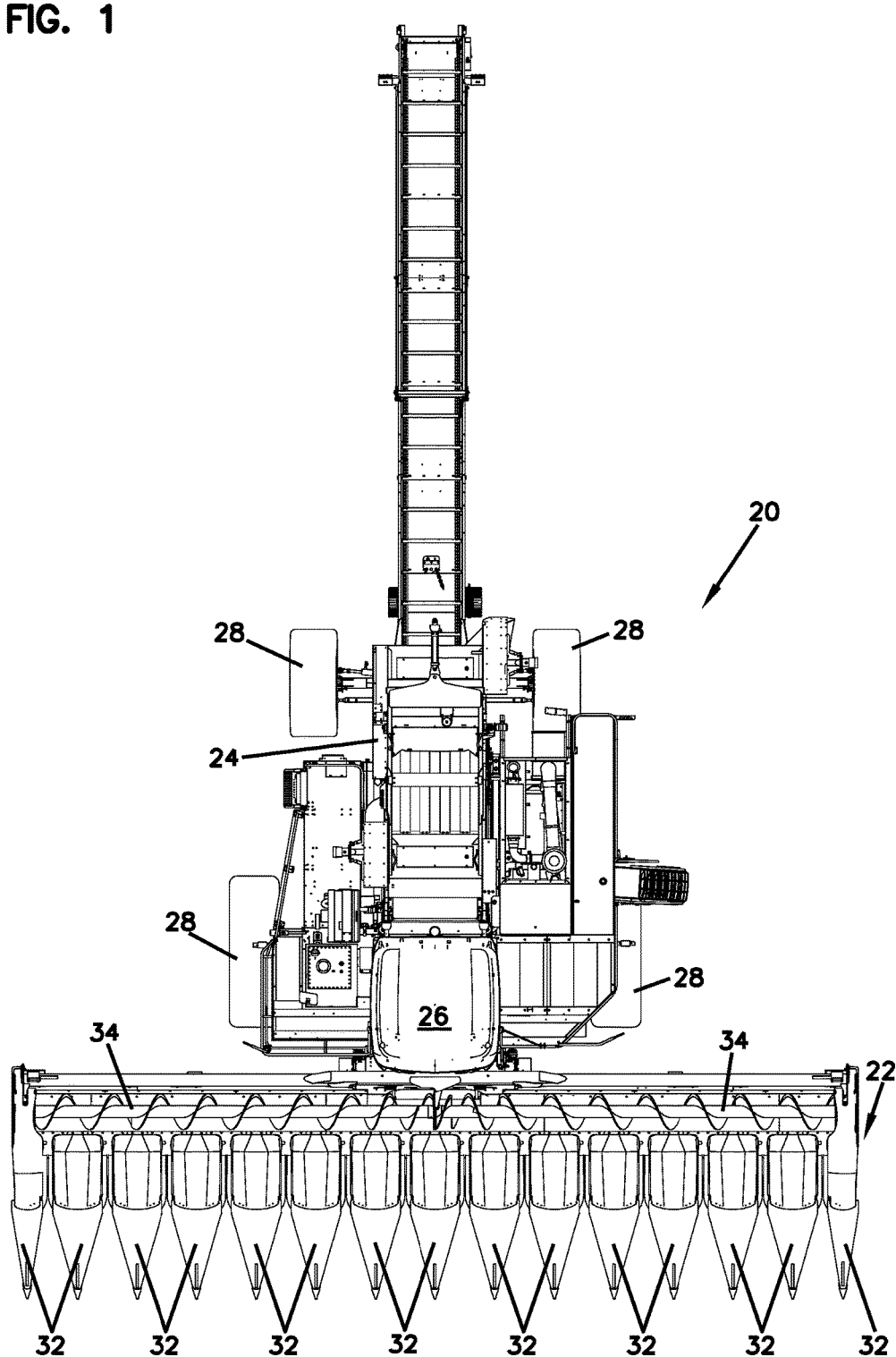
FIG. 1 is a top plan view of a harvester according to the principles of the present invention.

Referring now to the drawings and in particular to FIG. 1, there is shown a corn harvester, such as for corn, generally designated 20. Although a harvester 20 is shown in the figures, the present invention is also applicable to a combine including threshing equipment. A head 22 mounts at the front of a chassis 24. Harvesters 20 may include storage or a tow a dump cart. Harvester 20 typically includes a cab 26 where the operator sits and drives the harvester 20 and operates the various controls. Wheels 28 are typically mounted on the harvester 20 behind the head 22. The head 22 is typically removable and may be interchangeable with other heads for performing other tasks or for use with other crops.

Figure 2:
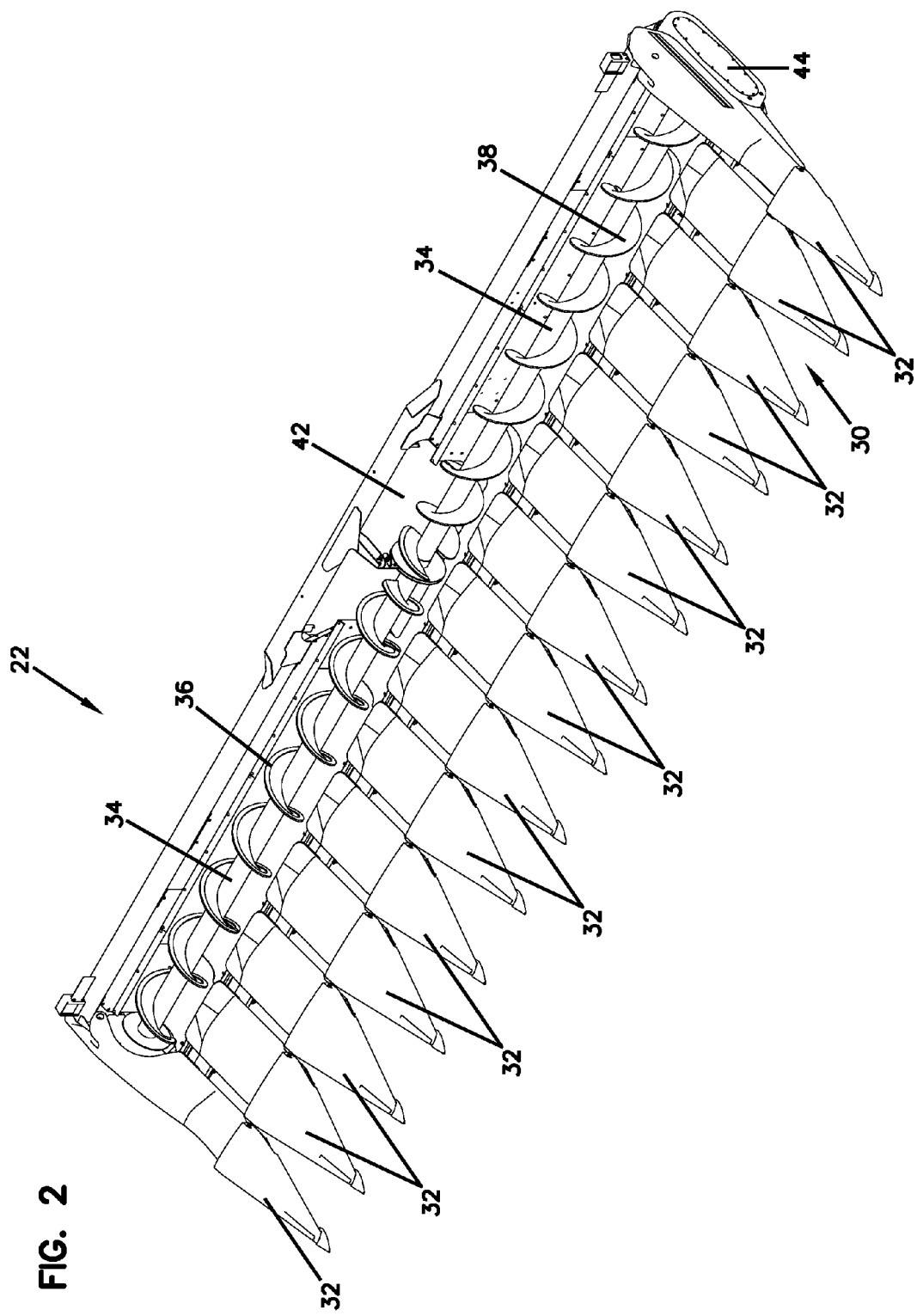
FIG. 2 is a perspective view of a corn head for the harvester shown in FIG. 1.
Figure 3:
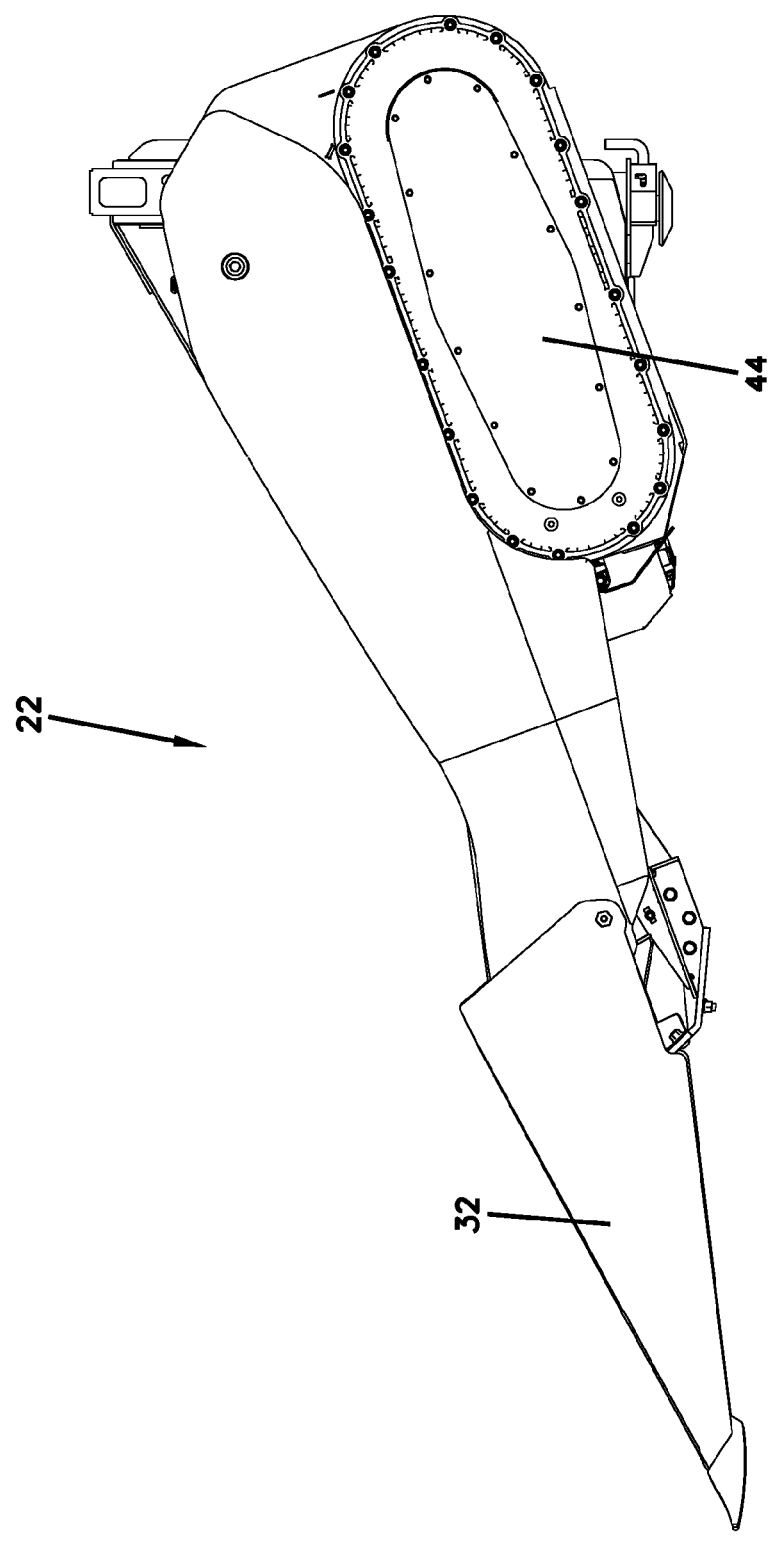
FIG. 3 is a side elevational view of the corn head shown in FIG. 2.

As shown in FIGS. 1-3, the head 22 includes a frame 40. The head 22 is supported on the front of the harvester 20 and also may have skids 46 to maintain the front of the head 20 at a position raised up from the ground. The head 22 includes row dividers, also known as separators 32, which include a cone shaped front portion and provide for directing the corn stalks into ear removal assemblies 30 between adjacent row separators. An auger 34 includes a drive 44 to feed the ears of corn removed from the stalks to an opening 42 from the rear of the head 22. The auger 34 includes a left helical vane 36 and a right helical vane 38 that direct the ears of corn to the center opening 42 for further storage and processing by the harvester 20.

Figure 4:
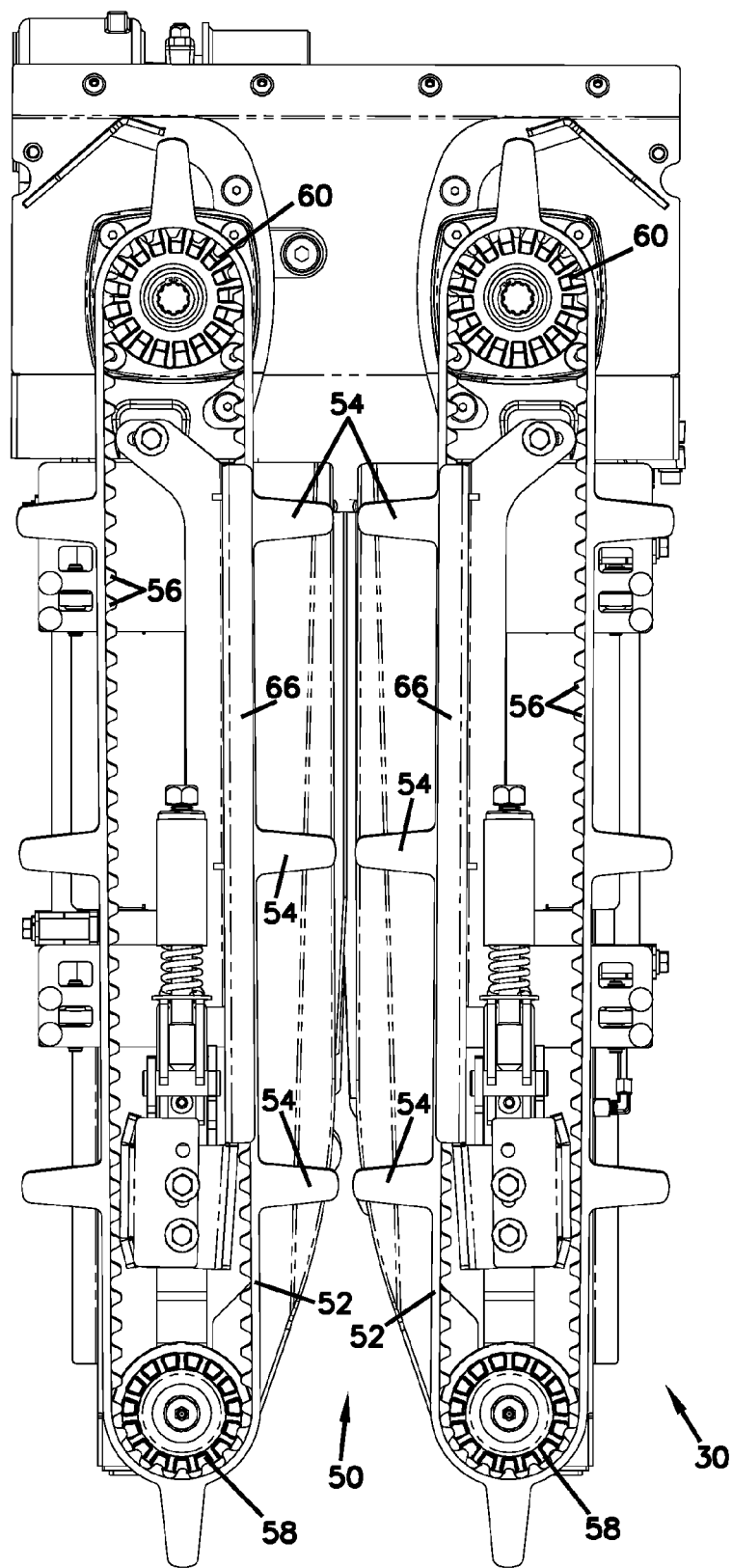
FIG. 4 is a top plan view of a stalk feeder assembly for the corn head shown in FIG. 2.
Figure 5:
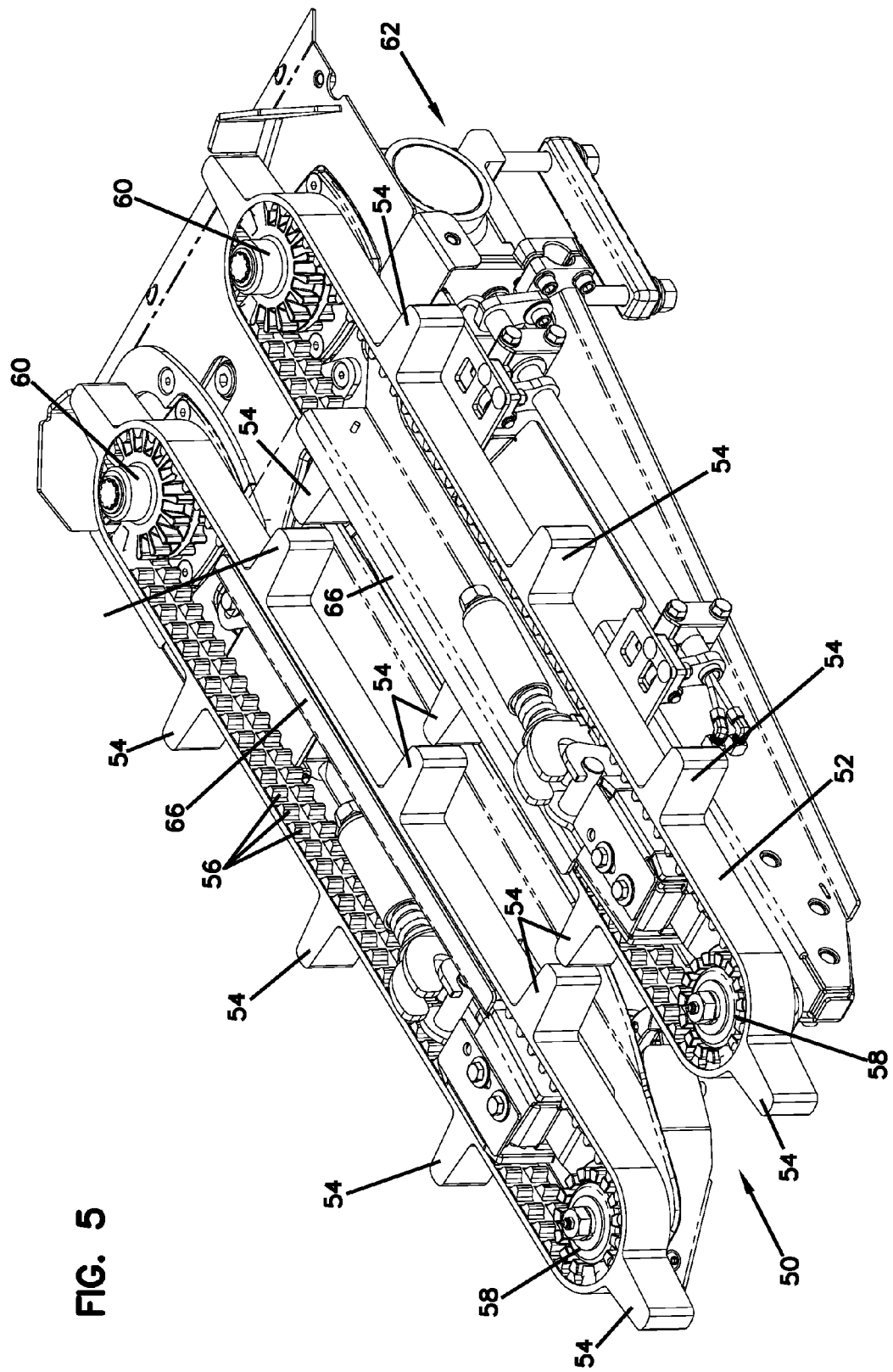
FIG. 5 is a perspective view of the stalk feeder assembly shown in FIG. 4.
Figure 6:
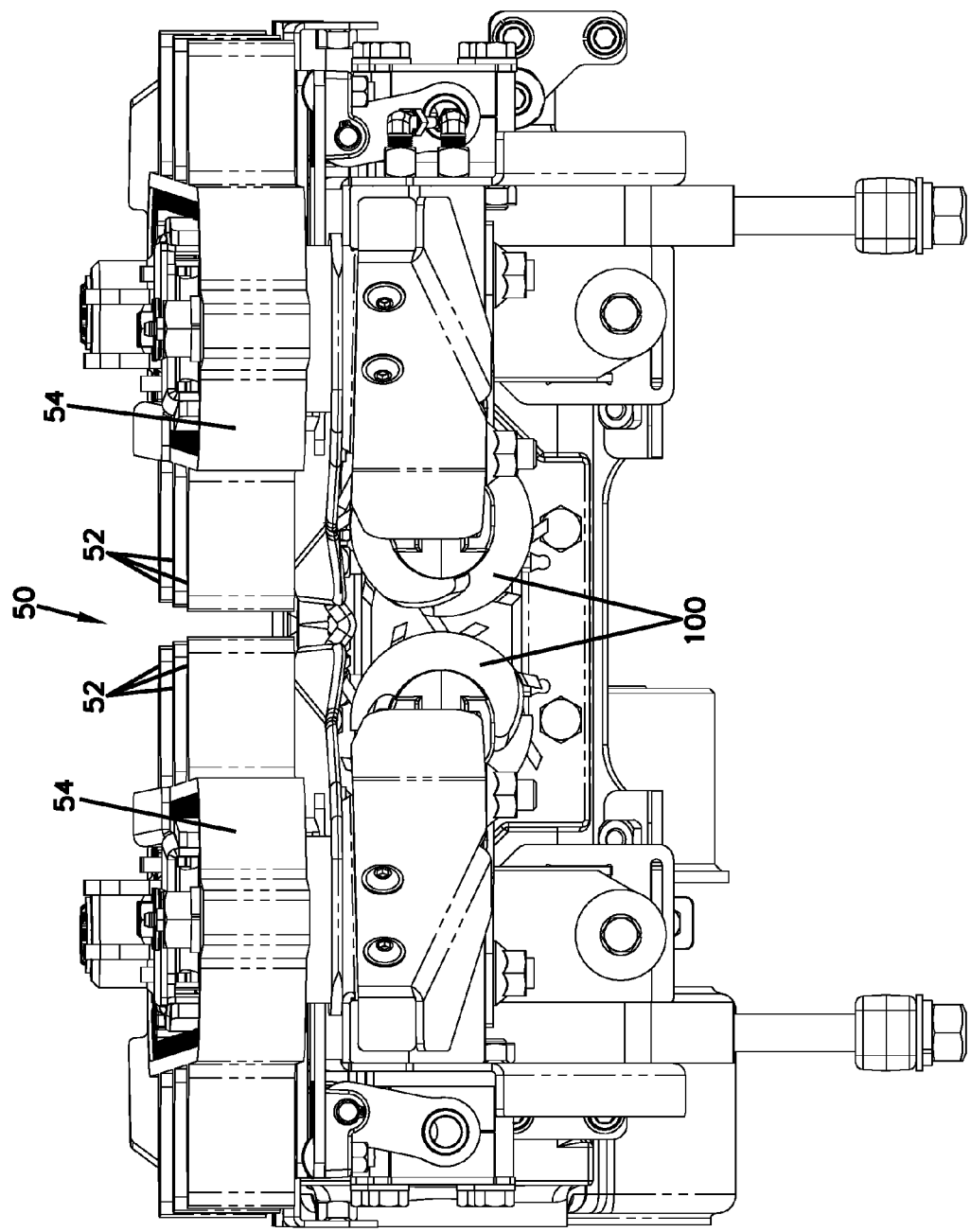
FIG. 6 is a front perspective view of the stalk feeder assembly shown in FIG. 4.
Figure 7:
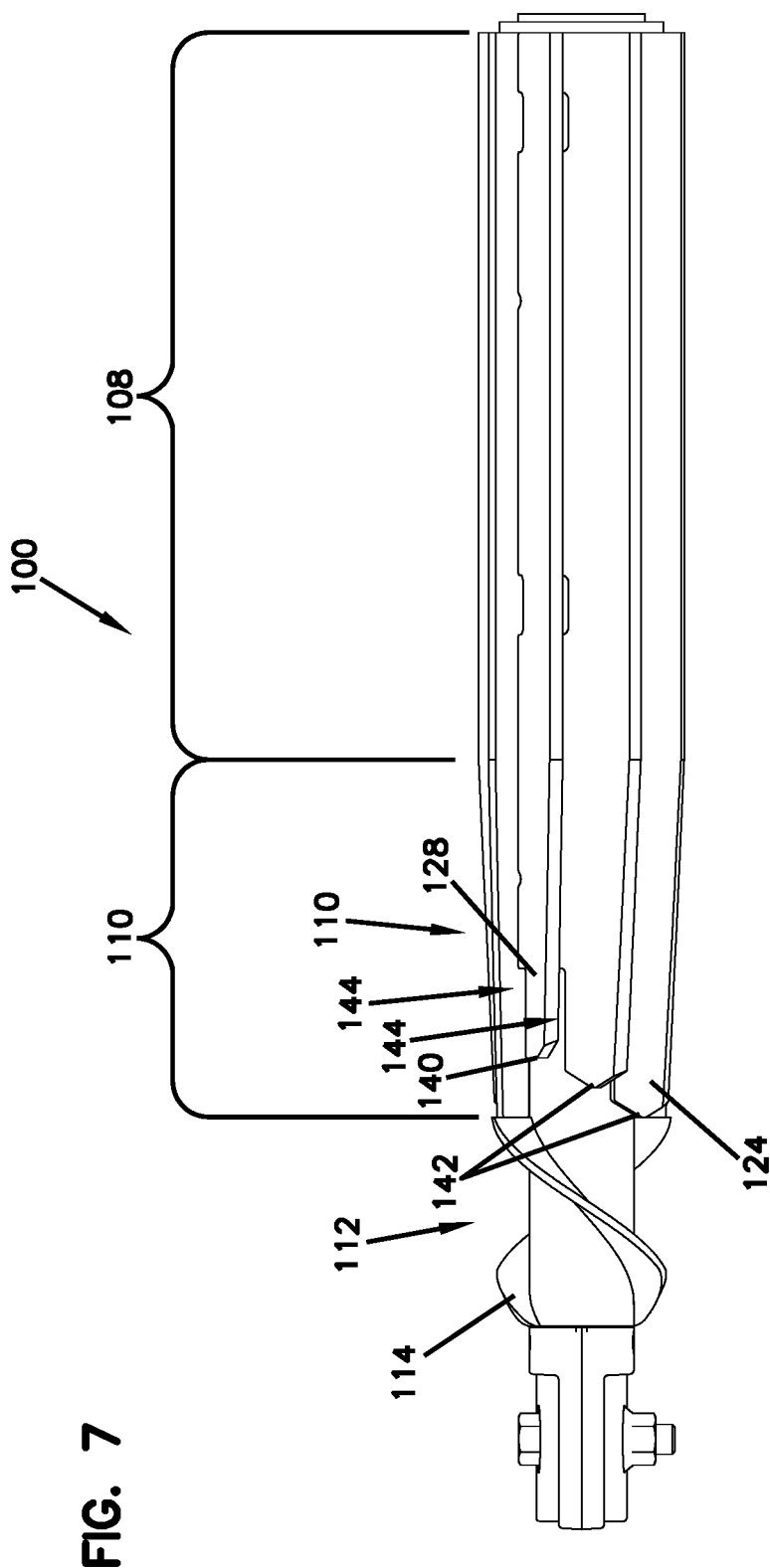
FIG. 7 is a side elevational view of a first embodiment of a stalk roll for the stalk feeder assembly shown in FIG. 4.
Figure 8:
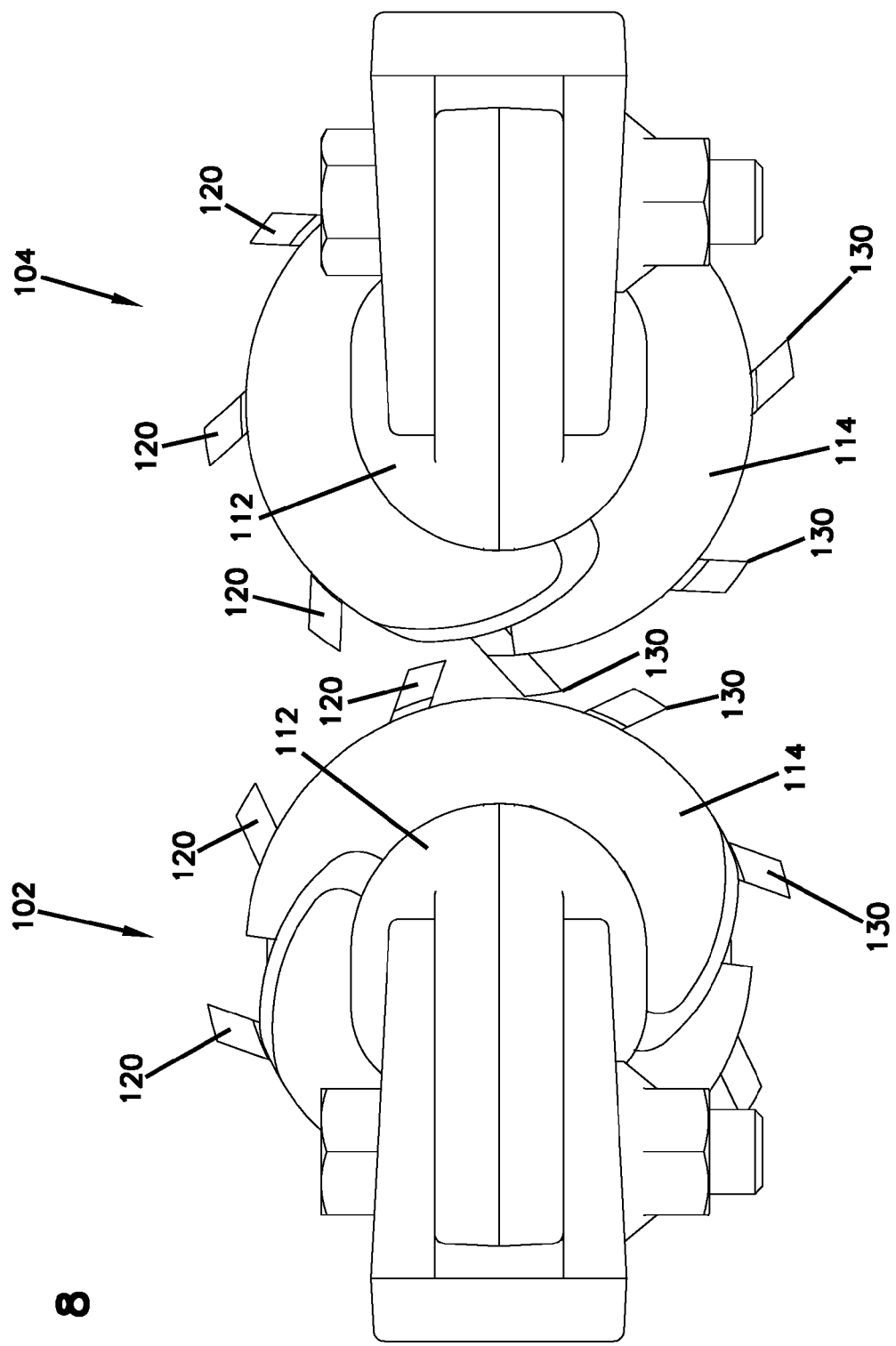
FIG. 8 is a front end elevational view of a pair of the stalk rolls shown in FIG. 7.
Figure 9:
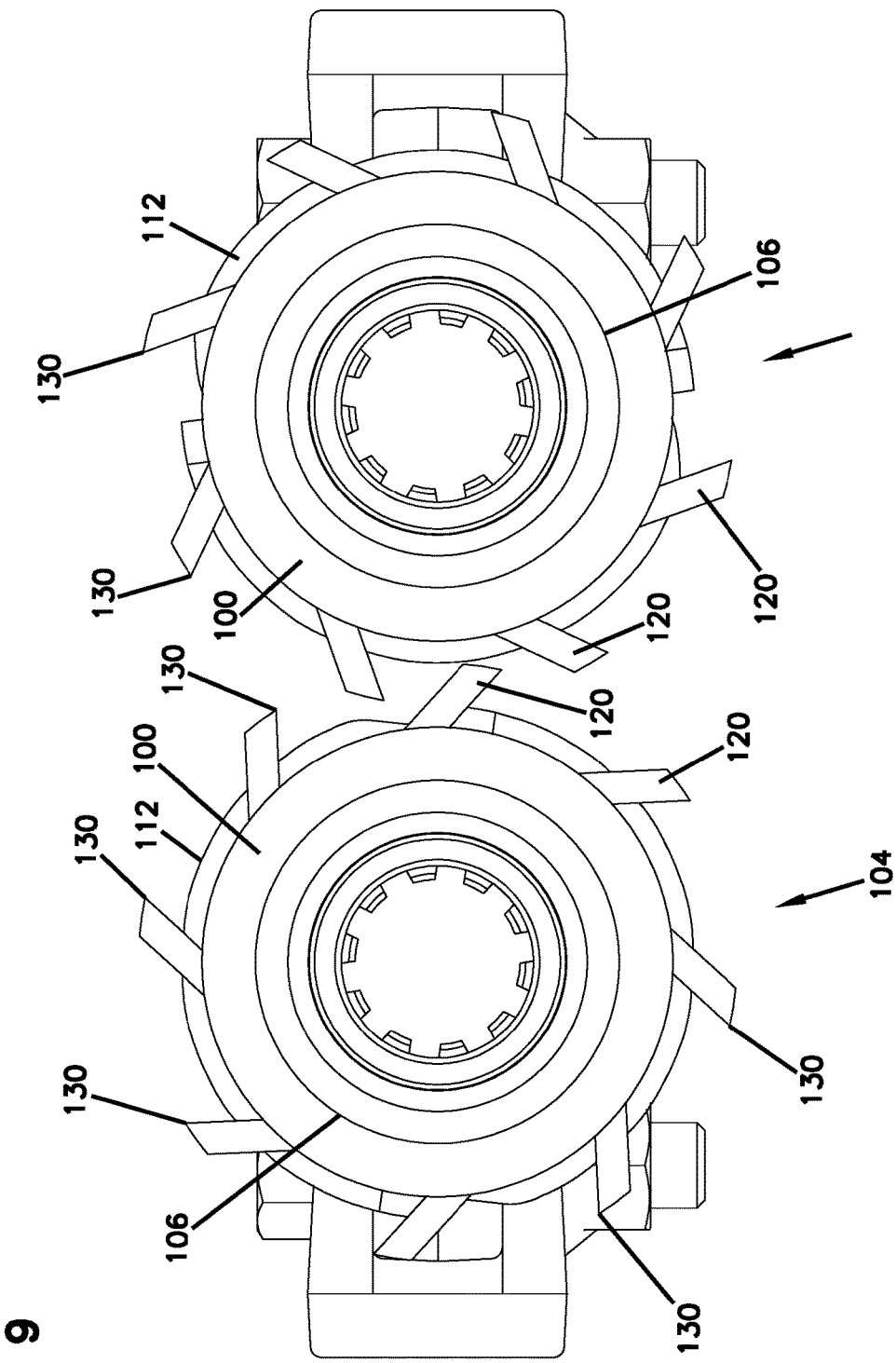
FIG. 9 is a rear end elevational view of the pair of stalk rolls shown in FIG. 8.
Figure 10:
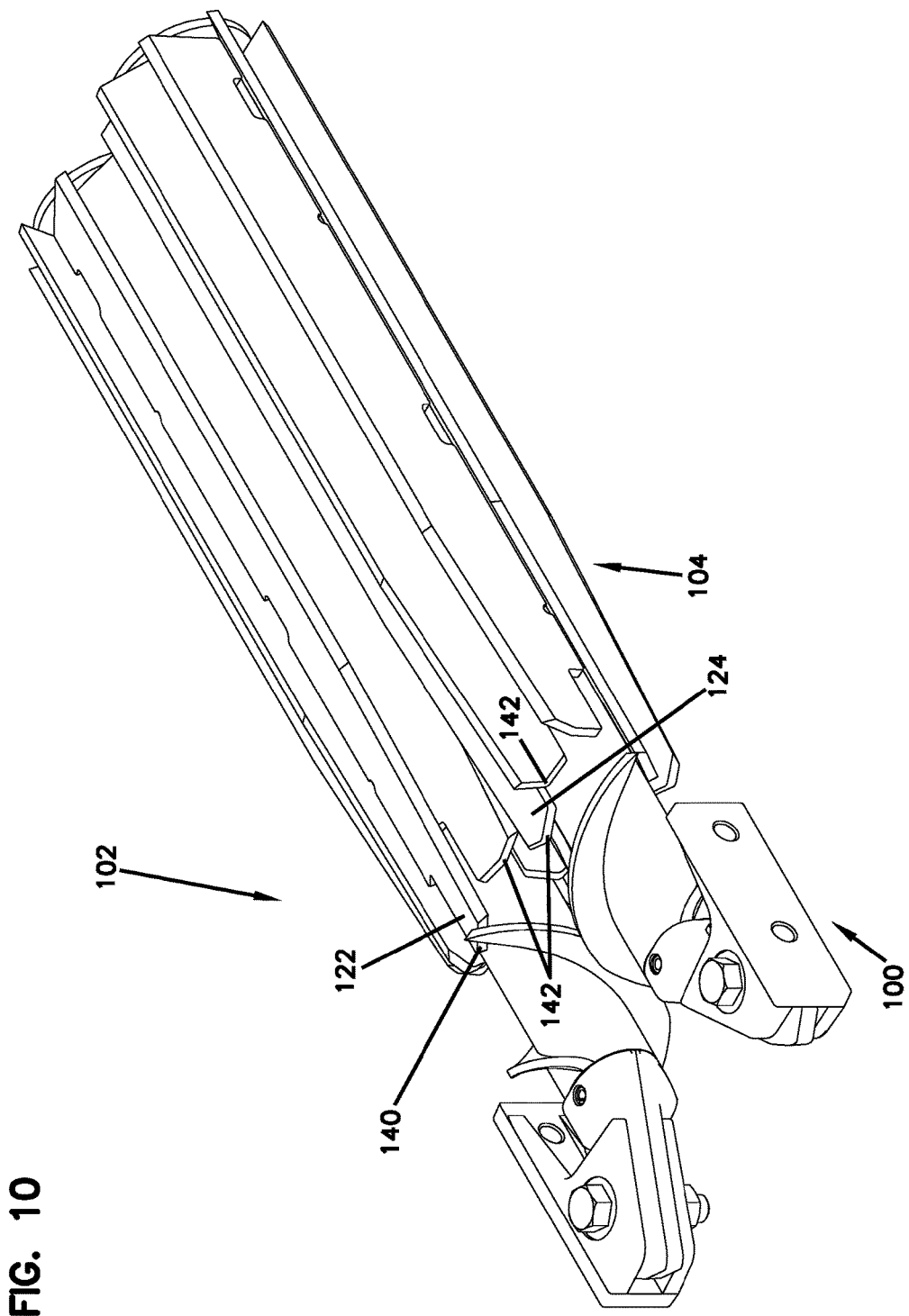
FIG. 10 is a perspective view of the pair of stalk rolls shown in FIG. 8.
Figure 11:
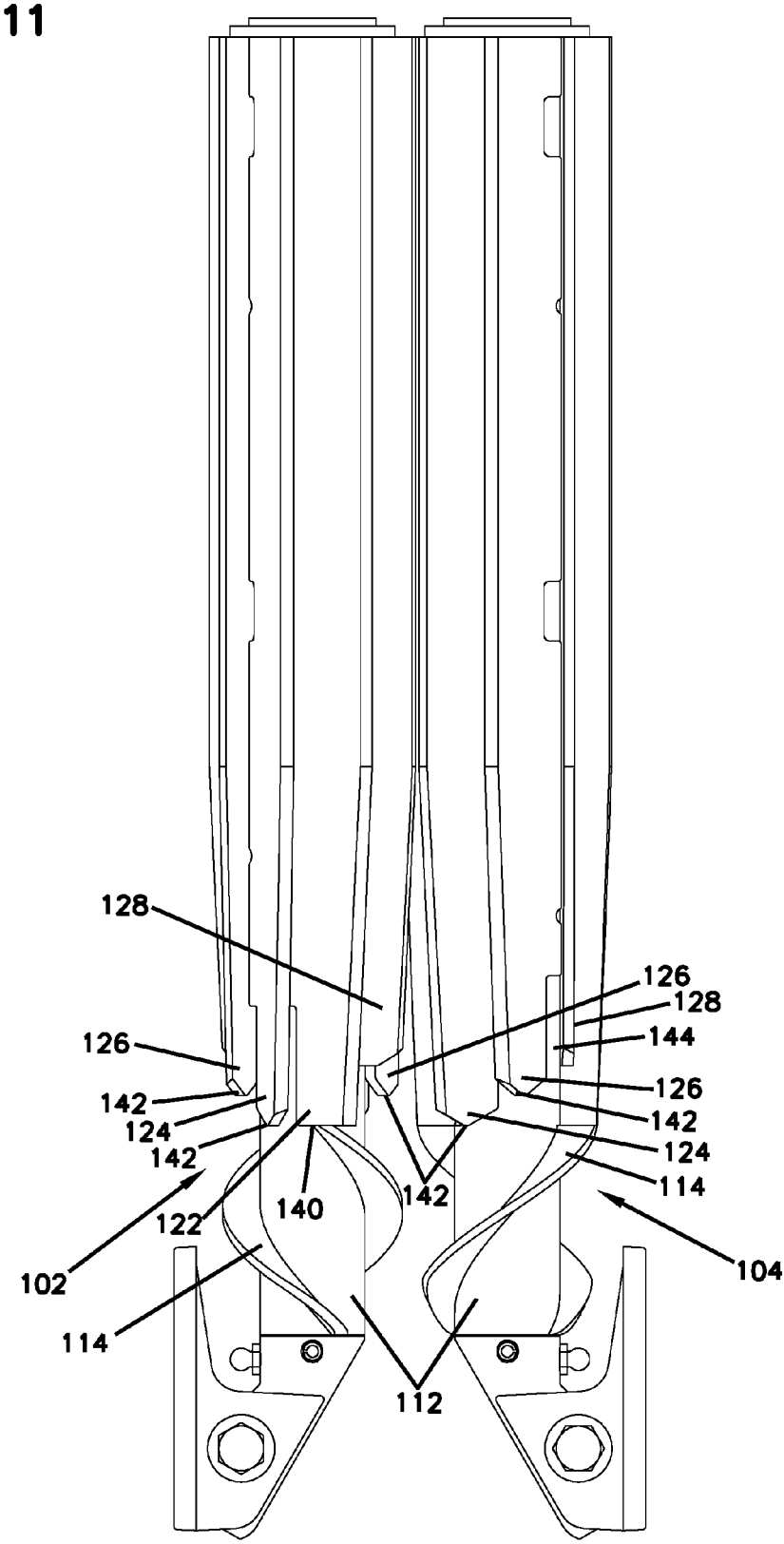
FIG. 11 is a top plan view of the pair of stalk rolls shown in FIG. 8.
Figure 12:
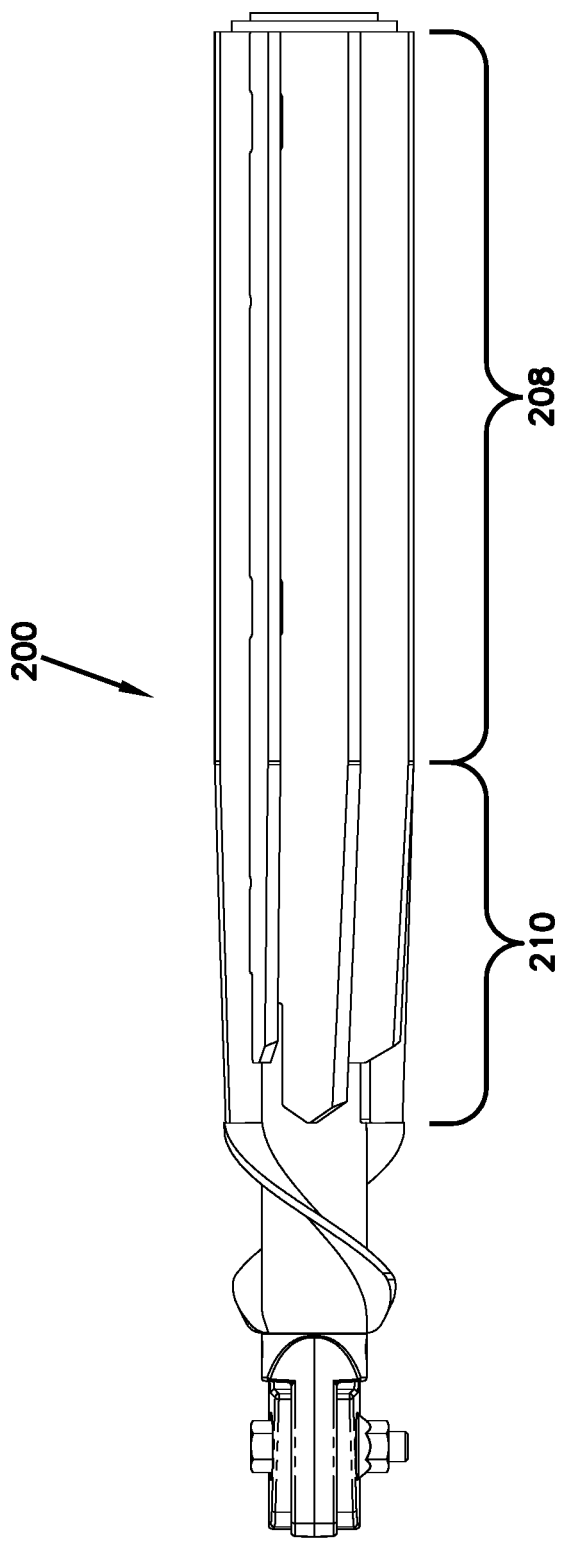
FIG. 12 is a side elevational view of a second embodiment of a stalk roll for the stalk feeder assembly shown in FIG. 4.
Figure 13:
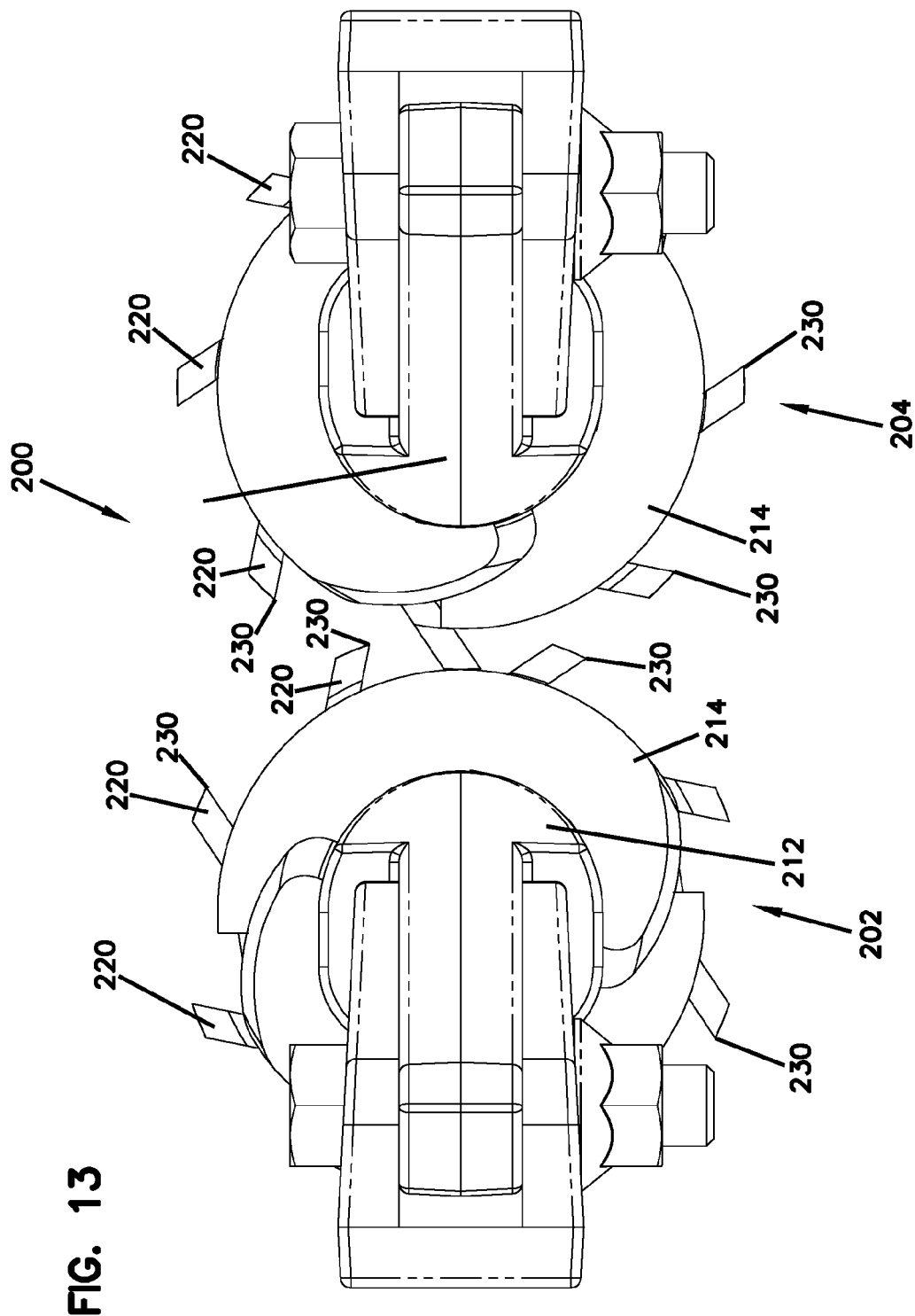
FIG. 13 is a front end elevational view of a pair of the stalk rolls shown in FIG. 12.
Figure 14:
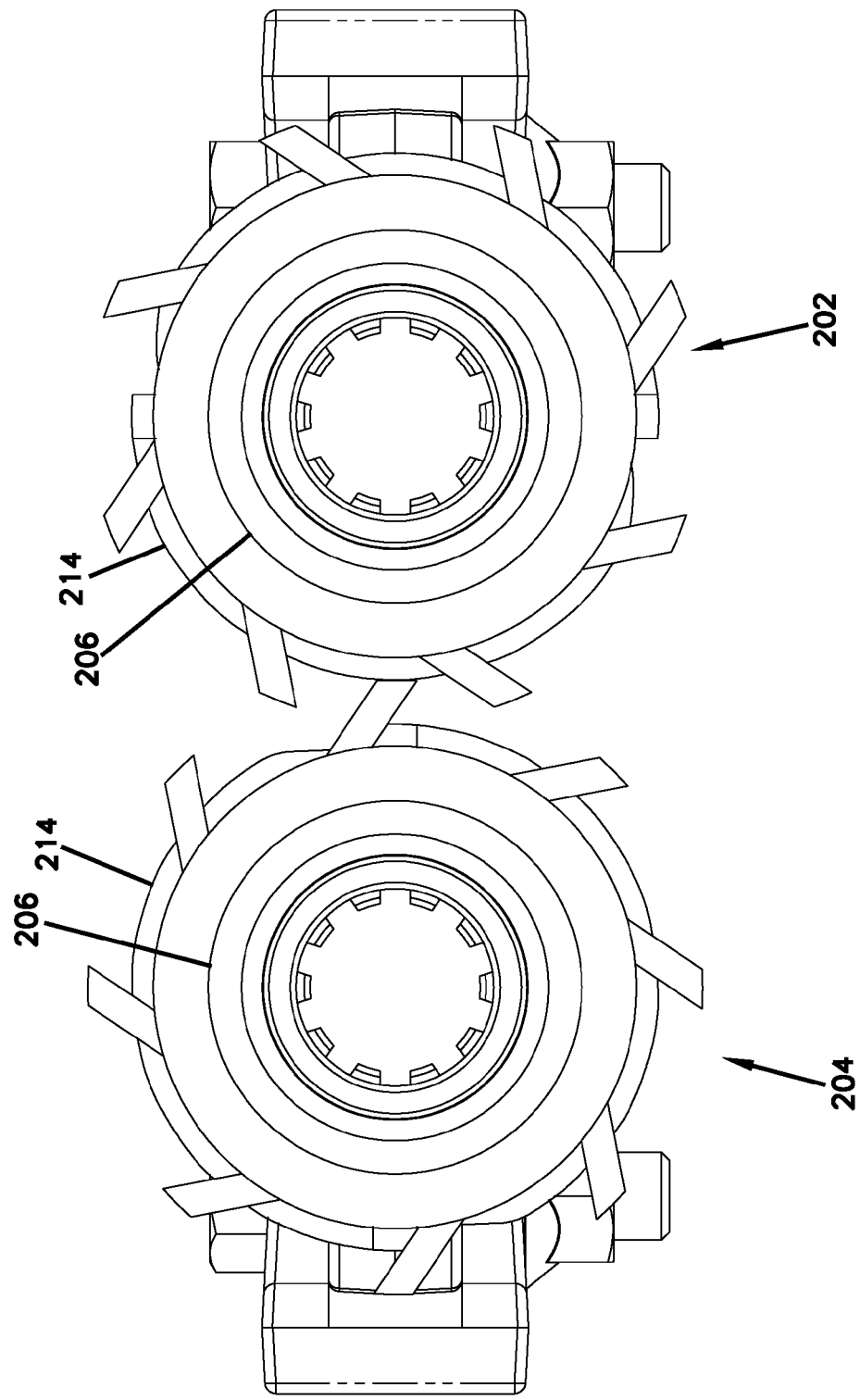
FIG. 14 is a rear end elevational view of the pair of stalk rolls shown in FIG. 13.
Figure 15:
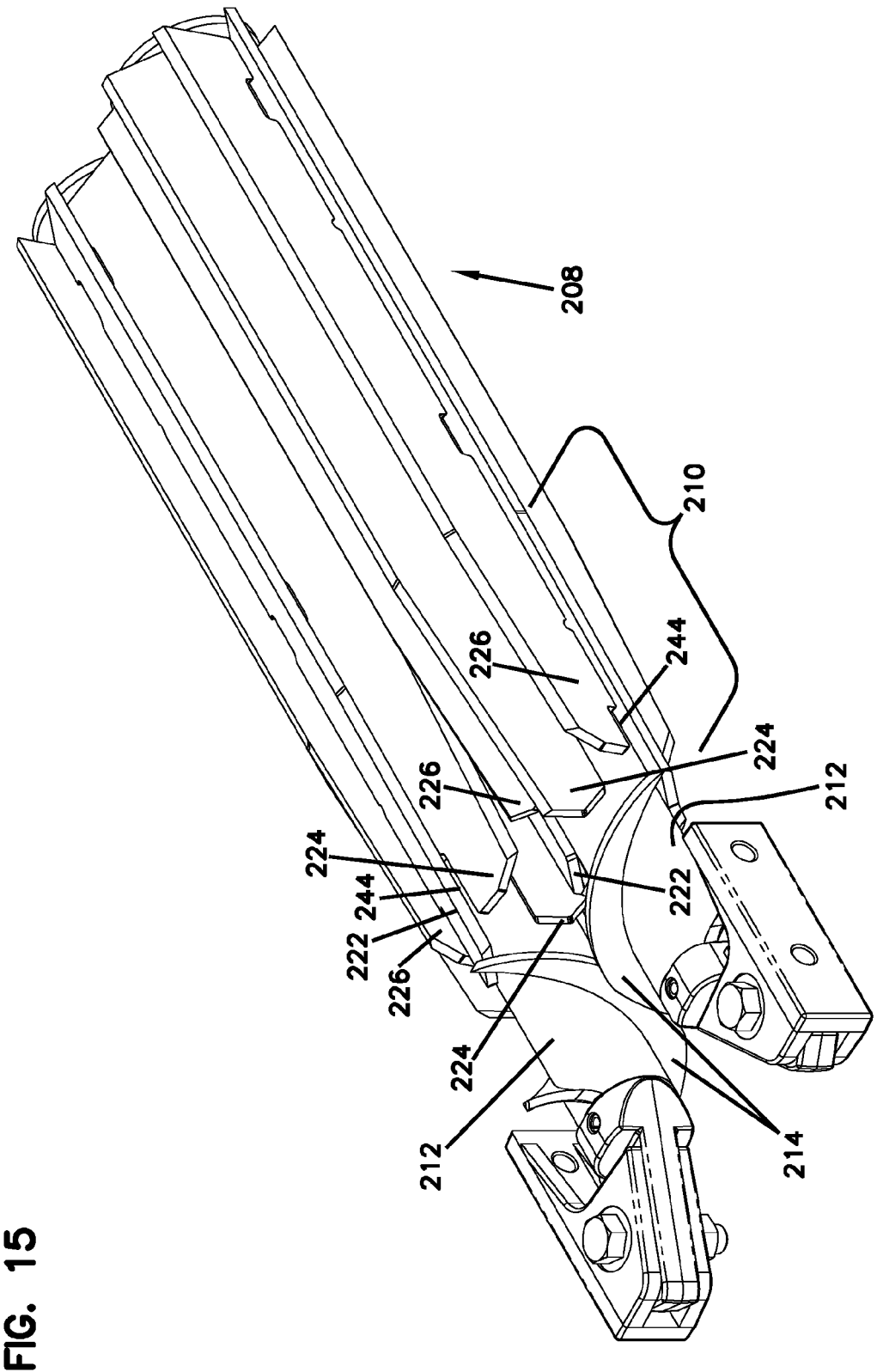
FIG. 15 is a perspective view of the pair of stalk rolls shown in FIG. 13.
Figure 16:
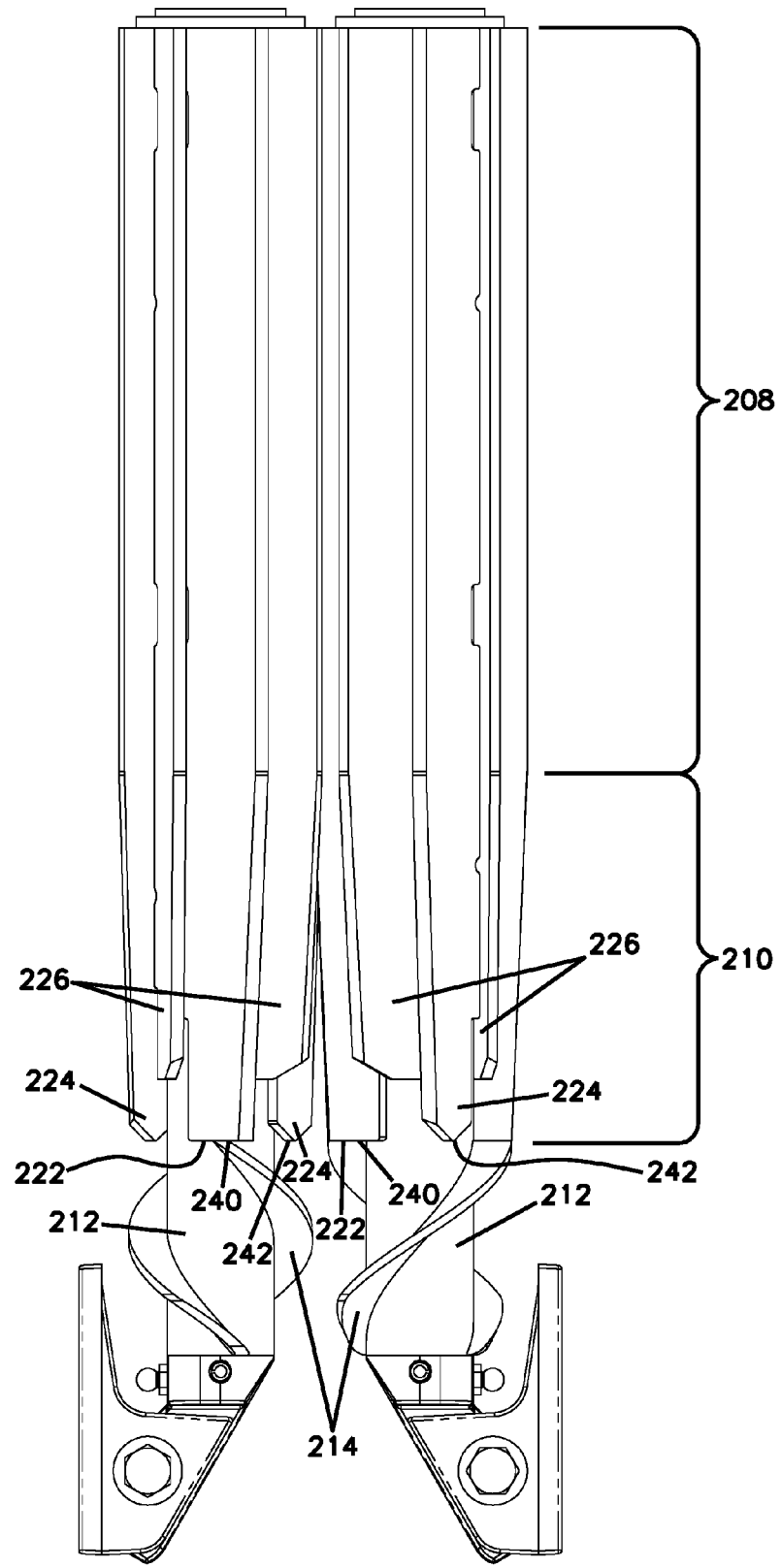
FIG. 16 is a top plan view of the pair of stalk rolls shown in FIG. 13.
Figure 17:
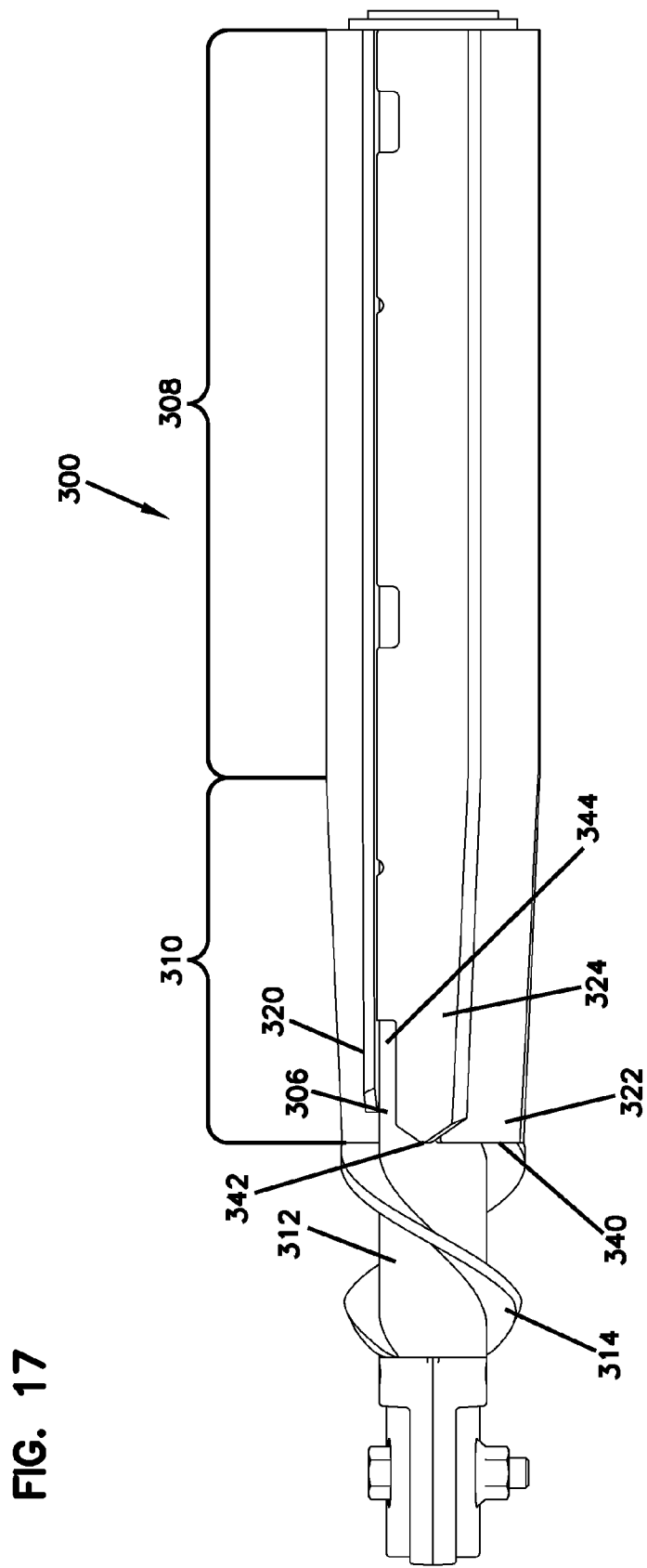
FIG. 17 is a side elevational view of a third embodiment of a stalk roll for the stalk feeder assembly shown in FIG. 4.
Figure 18:
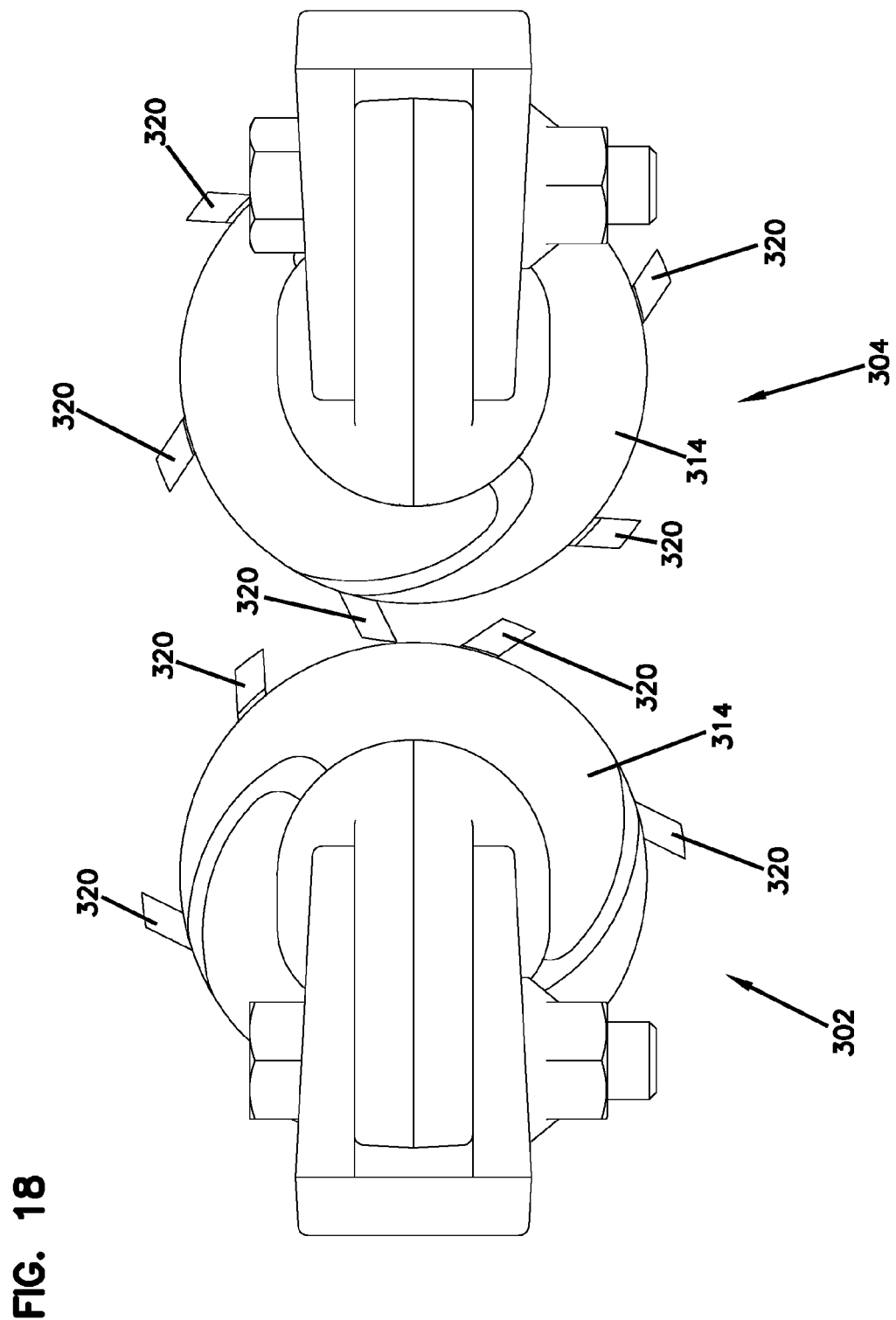
FIG. 18 is a front end elevational view of a pair of the stalk rolls shown in FIG. 17.
Figure 19:
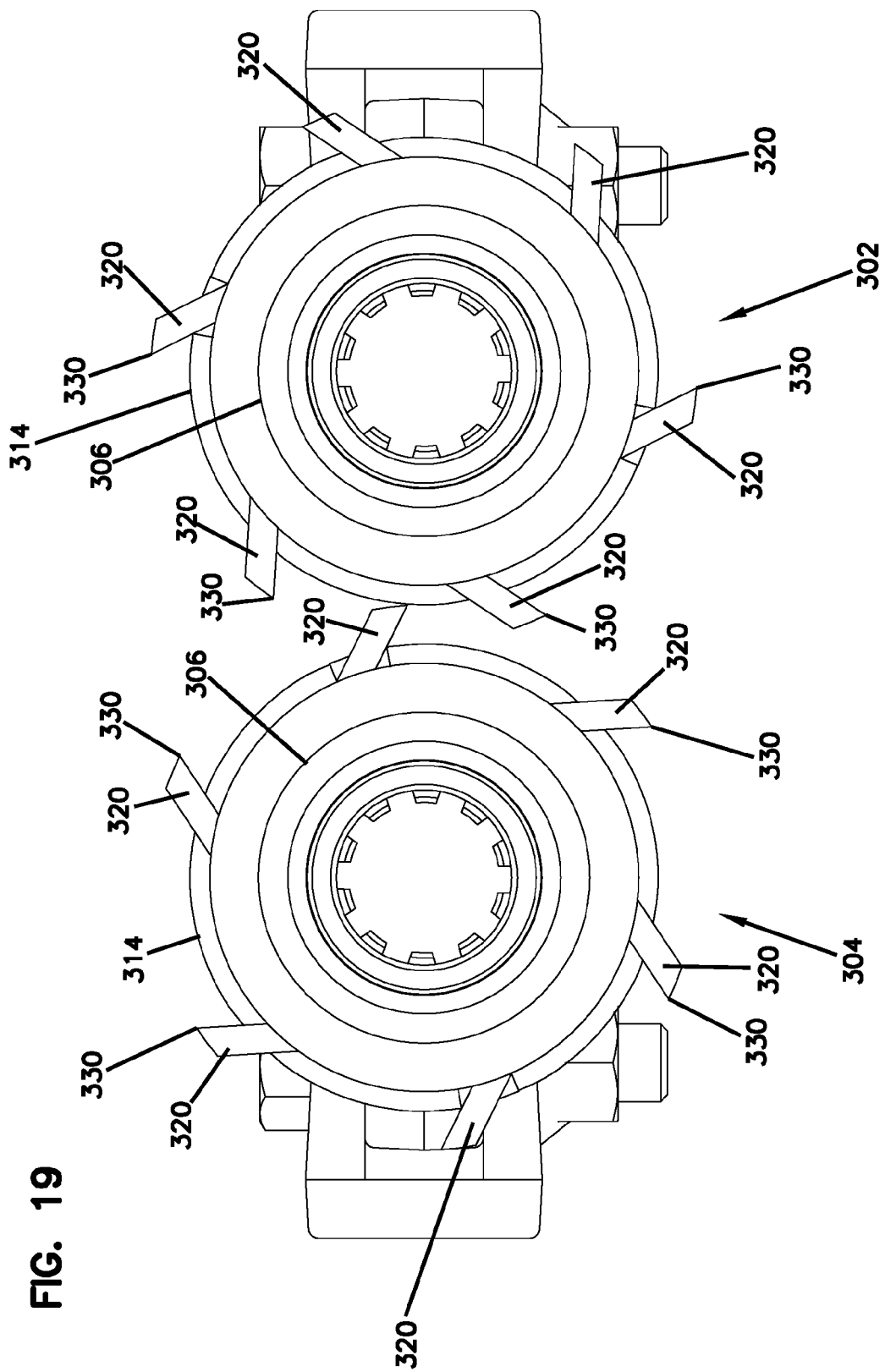
FIG. 19 is a rear end elevational view of the pair of stalk rolls shown in FIG. 18.
Figure 20:
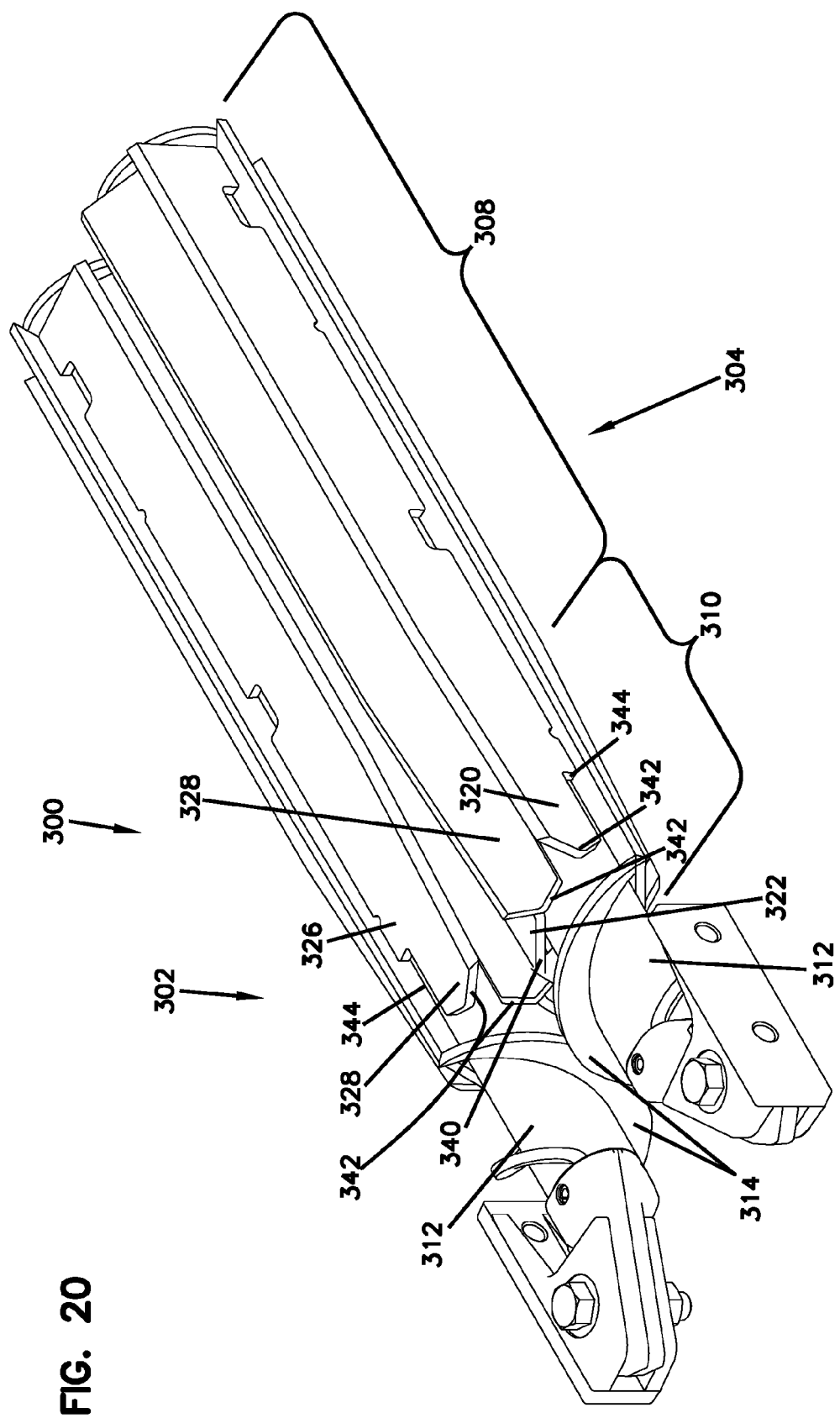
FIG. 20 is a perspective view of the pair of stalk rolls shown in FIG. 18.
Figure 21:
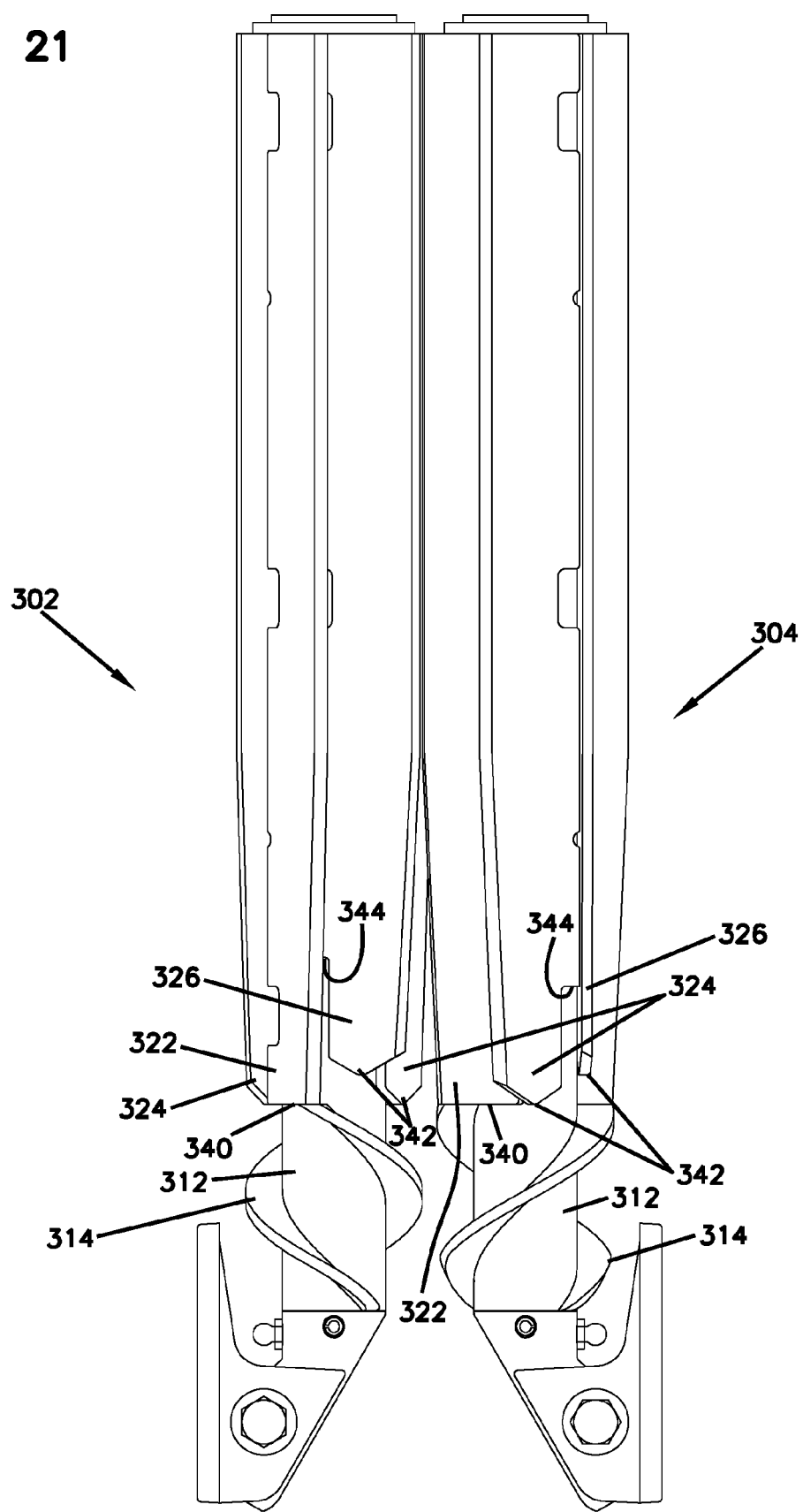
FIG. 21 is a top plan view of the pair of stalk rolls shown in FIG. 18.
Figure 22:
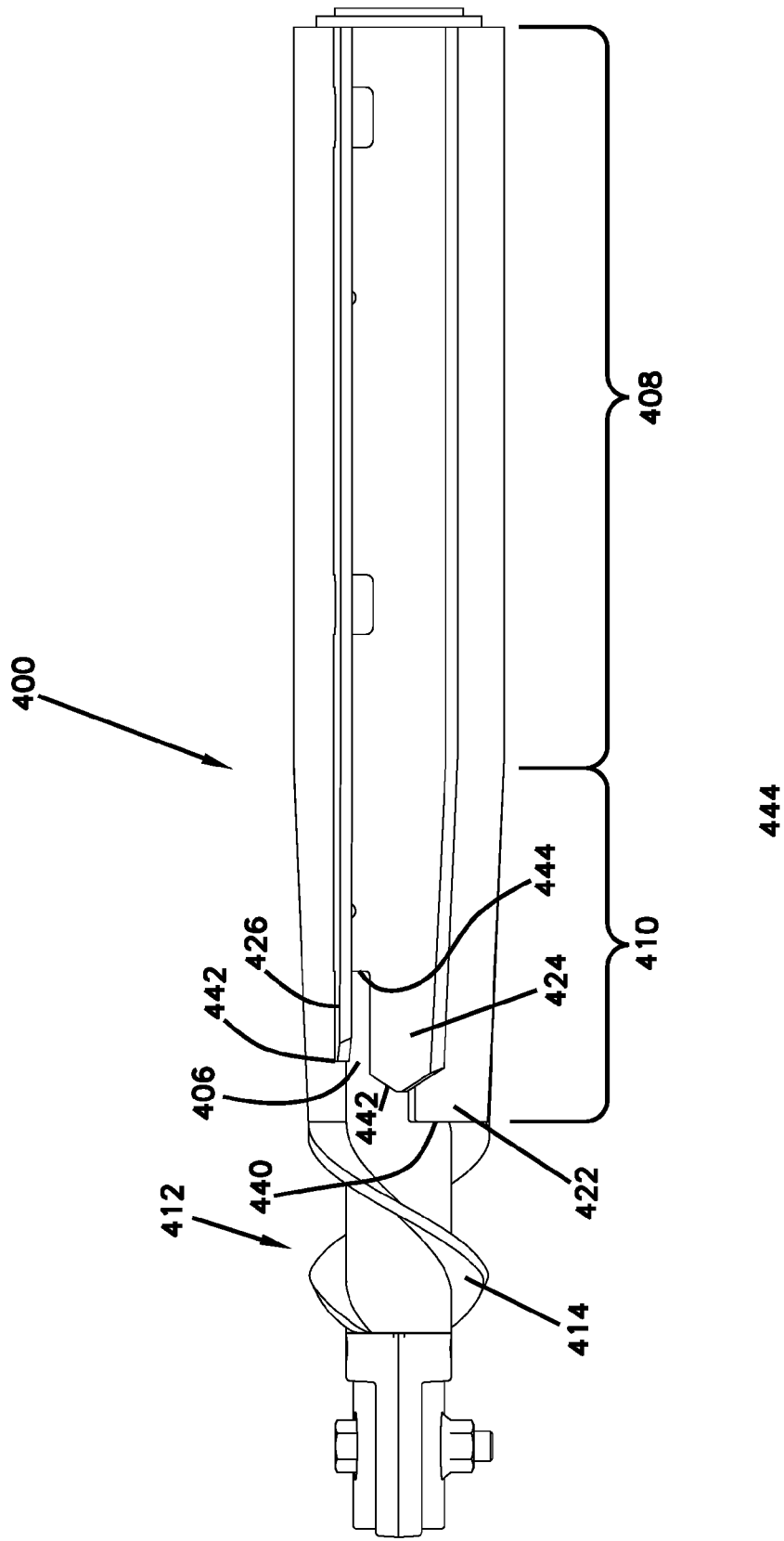
FIG. 22 is a side elevational view of a fourth embodiment of a stalk roll for the stalk feeder assembly shown in FIG. 4.

Referring to FIGS. 4-6, the ear removal assembly 30 includes a corn stalk gathering assembly 50. The gathering assembly 50 engages corn stalks directed to the ear removal assembly 30 by the row separators (dividers) 32. The corn stalks are engaged by paddles 54 on rotating belts 52 or chains. The belts 52 include lugs 56 that are driven by drive sprockets 60 and also extend around idler sprockets 58. A drive shaft links to a gearbox 62 and drives the sprockets 60. The gathering assembly 50 includes pairs of belts 52 so that the paddles 54 extend toward one another and engage the corn stalks. Although belts 52 are shown, it is also known in the art to use gathering chains with paddles mounted on the chains for engaging the corn stalks. The corn stalks are pulled rearward and the ears of corn engage opposing stripper plates 66 above the gathering assembly 50 and are removed as the stalks are pulled down by stalk rolls, as explained hereinafter. The gathering assembly paddles 54 will then push the ears rearward to the auger 34.

In addition to being directed rearward by the gathering assembly 50, the stalks are pulled downward by an opposed pair of stalk rolls, also commonly referred to as knife rolls, generally designated 100, 200, 300 or 400.

Referring to FIGS. 7-11, there is shown a first embodiment of a pair of stalk rolls, generally designated 100. All of the embodiments of stalk rolls according to the present invention generally share a center tube with longitudinally extending flutes protruding radially outward at an oblique angle to the center tube. Each of the flutes generally has a knife edge that provides for crimping and chopping the stalk rolls for improved treatment prior to the corn stalk roll being returned to the field. Each of the stalk rolls includes an impellor with a helical vane that forms a nose that engages the corn stalks by the vane and directs the stalks rearward. The stalk rolls are generally positioned below the belts 52 of the gathering assemblies 50. In conjunction with the paddles 54 and the gathering assemblies 50, the stalks are generally pulled rearward to be engaged by the flutes of the stalk rolls.

Referring now to FIGS. 7-11, a first embodiment of stalk rolls 100 includes a left stalk roll 102 and a right stalk roll 104. Each of the stalk rolls 102 and 104 includes a center tube 106 having a straight section and a forward tapered section. The tapered section 110 leads to a forward impellor 112 having helical vanes 114 formed thereon to aid in feeding the corn stalks rearward. The tube 106 has flutes, or blades 120, extending radially outward slanted toward the rotation direction and along the length of the tube 106. In the embodiment shown, there are eight flutes 120 including two sets of four different style flutes. The stalk rolls 100 include first flutes 122 having a flat front edge 140 and a first length. Flutes 124 are substantially the same length as the flutes 122, but include a leading edge 142 that leads to a point. Flutes 126 are shorter than the flutes 122 and 124. The flutes 126 also include a pointed leading edge 142. Flutes 128 have a third length and are shorter than the flutes 122, 124 and 126. Flutes 128 also include a pointed leading edge 142. Moreover, the flutes 120 may include notches 144 formed in a leading edge in one or more of the flutes 120 and extending rearward along the exterior of the center tube 106. Each of the flutes 120, may include a knife edge 130 extending longitudinally along the most radially outward portion of the flutes 120. The stalk rolls 192 and 104 rotate in opposite directions so that the flutes 120 of the left stalk roll 102 and the right stalk roll 104 move downward in the space between the stalk rolls 102 and 104 and interact to process the corn stalks for returning to the field. The advantageous configuration of the flutes provides for shortening the overall length of the stalk rolls 100 in a more compact head. This is due to improved progressive feeding from the spacing provided by the different length flutes 120 and providing a volume to accept the corn stalks.

Referring now to FIGS. 12-16, there is shown a second embodiment of stalk rolls, generally designated 200. Stalk rolls 200 include a left stalk roll 202 and a right stalk roll 204. The stalk rolls 202 and 204 are similar to stalk rolls 102 and 104 except for a different configuration of the flutes. Each of the stalk rolls 202 and 204 includes a center tube 206, a straight section 208 and a tapered section 210. An impellor 212 is at the front nose of the stalk rolls 200 and each impeller 212 includes a helical vane 214.

Each of the stalk rolls 200 include eight flutes, or blades 220, spaced around the periphery of the center tube 206 extending at an oblique angle to the surface of the center tube slanted toward the rotating direction. The flutes 220 extend longitudinally along the straight section 208 and for a portion of the tapered section 210. In the embodiment shown in FIGS. 12-16, eight flutes 220 extend about a periphery of the center tube. The flutes 220 are angled in opposite directions between the left stalk roll 202 and the right stalk roll 204. Flutes 222 have a first length and a long flat leading edge 240. Flutes 224 have substantially the same length as flutes, 222 but include a pointed leading edge 242. Flutes 226 are shorter than the flutes 222 and 224 and also include a pointed leading edge 242. The shorter flutes 226 are alternately spaced around the periphery of the stalk rolls 200 between flutes 220 and 224. Therefore, each of the stalk rolls 200 includes two flutes 222, two flutes 224 and four shorter flutes 226. One or more of the flutes 220 may include notches 244 extending from the leading edge and along the surface of the center tube 206. Moreover, the radially outer edge of the flutes 220 includes a knife edge 230. As with stalk rolls 100, the stalk rolls 200 achieve a shortened, more compact configuration and are able to achieve progressive feeding and improved processing of the stalks for returning back to the field.

Referring to FIGS. 17-21, there is shown a third embodiment of stalk rolls, generally designated 300. The stalk rolls 300 include a left stalk roll 302 and a right stalk roll 304. The stalk rolls 300 are generally similar to the other embodiments 100 and 200 except for the configuration of flutes 320. Each of the stalk rolls 302 and 304 includes a center tube 306 including straight section 308 and a tapered front section 310. An impellor 312 mounts at the front of each stalk roll proximate the tapered section 310 and each impellor 312 includes helical vanes 314.

In the embodiment shown in FIGS. 17-21, each of the stalk rolls includes six flutes, or blades, 320. Flutes 322 extend from the rear forward at a first length and include a generally flat planar leading edge 340. Flutes 324 extend forward substantially the same length as flutes 322 but include a pointed leading edge 342. Flutes 326 extend from the rear of each stalk roll 300 forward but are shorter than flutes 322 and 324. In the embodiment shown, each of the flutes 326 include a pointed leading edge 342. Moreover, one or more of the flutes 320 may include a notch formed extending rearward from a leading edge of the flute and along the surface of the center tube 306. Each of the flutes 320 also includes a knife edge 330 along the radially outer extremity of the flutes 320. The configuration of the flutes 322, 324 and 326 provides for improved progressive feeding and improved processing of the corn stalks and the stalk rolls 300 achieve a shorter length than conventional stalk rolls for a more compact design and a more compact and light weight head.

Referring to FIGS. 22-26, there is shown a fourth embodiment of stalk rolls, generally designated 400. The stalk rolls 400 include a left stalk roll 402 and a right stalk roll 404. The stalk rolls 400 are similar to the other embodiments 100, 200 and 300, but have a different configuration of flutes 420. Each of the stalk rolls 402 and 404 includes a center tube 406 having a straight section 408 and a tapered section 410 tapering at the front of each stalk roll. An impellor 412 mounts proximate the tapered section 410 and includes helical vanes 414.

Figure 23:
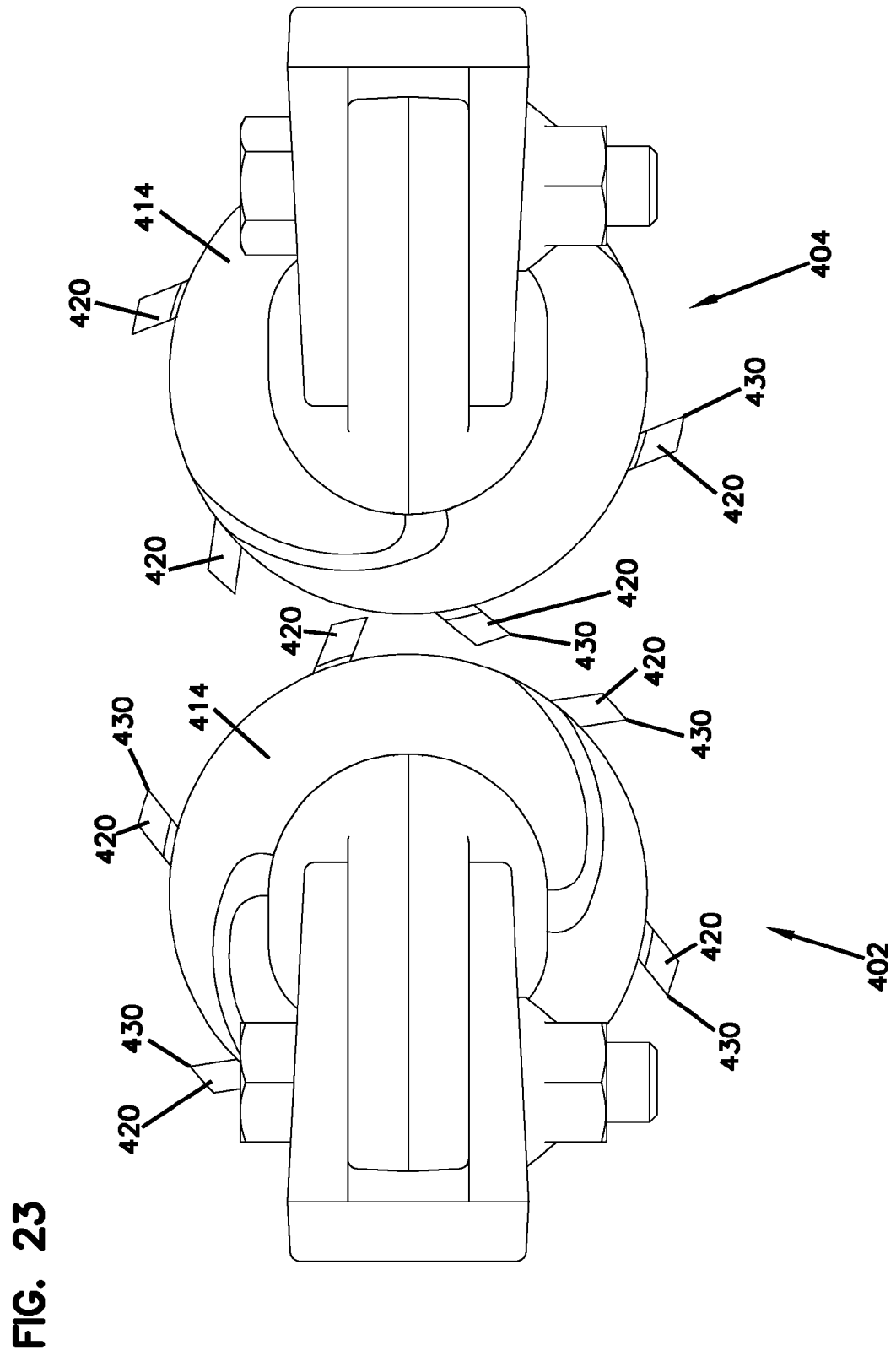
FIG. 23 is a front end elevational view of a pair of the stalk rolls shown in FIG. 22.
Figure 24:
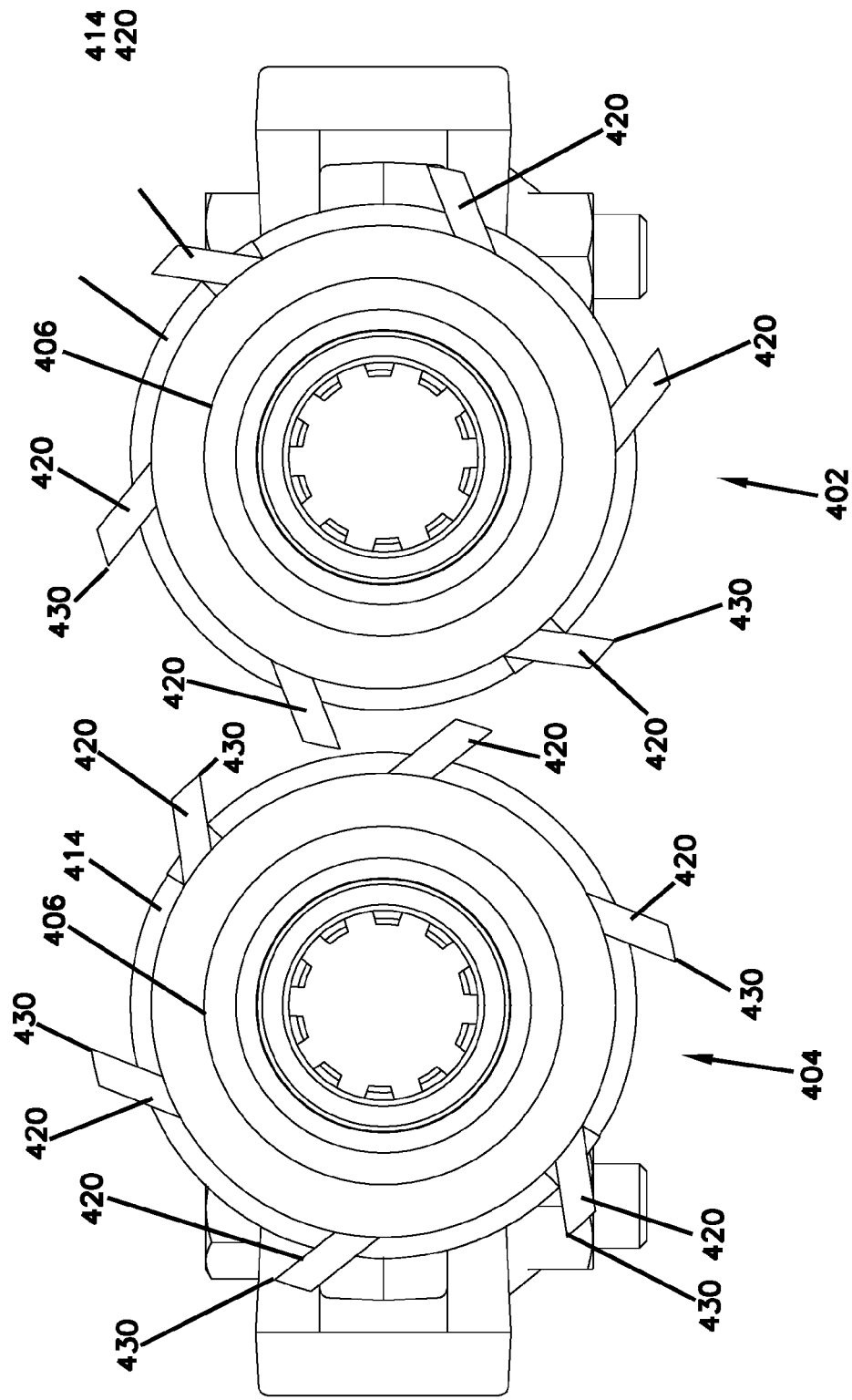
FIG. 24 is a rear end elevational view of the pair of stalk rolls shown in FIG. 23.
Figure 25:
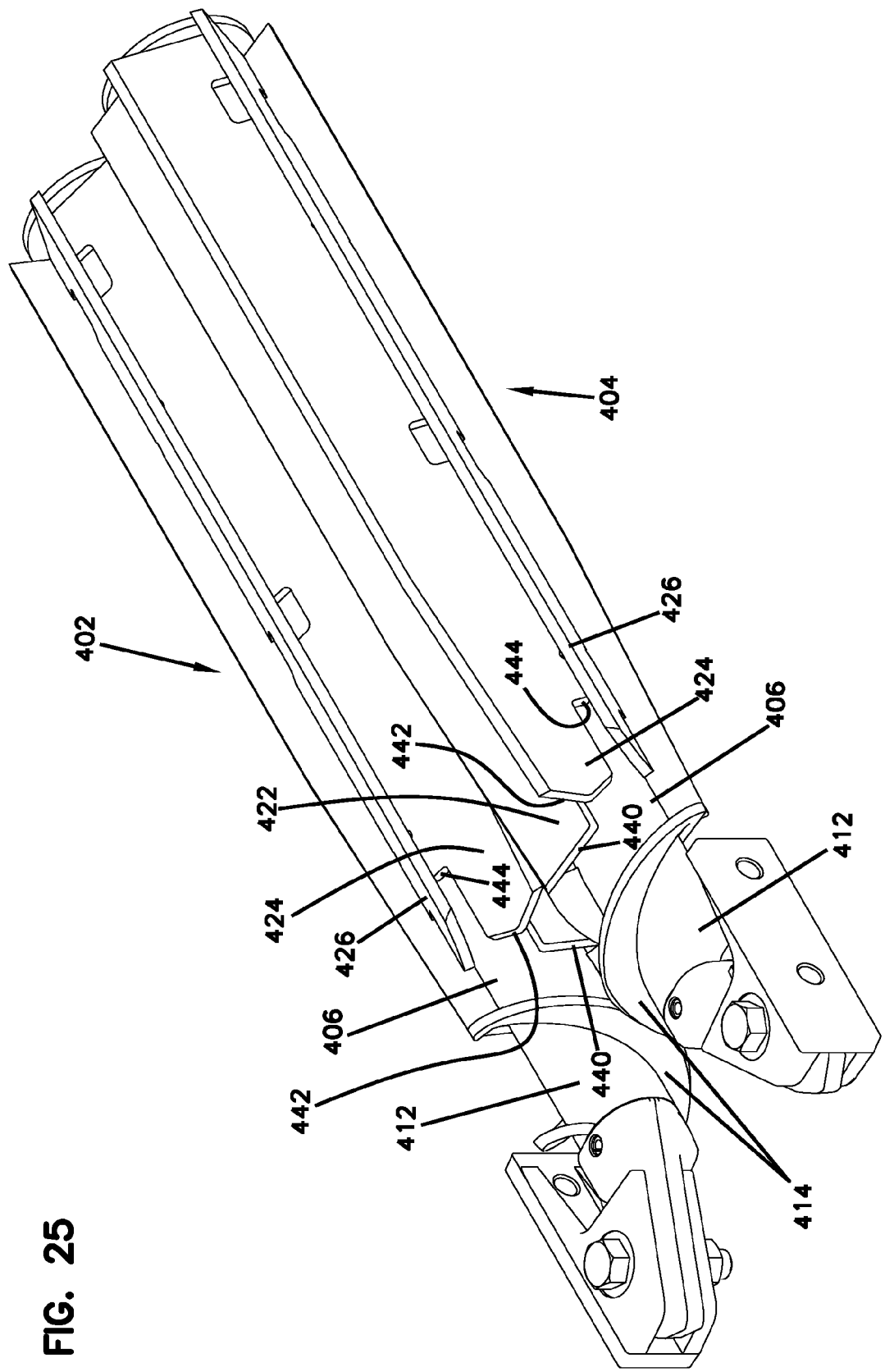
FIG. 25 is a perspective view of the pair of stalk rolls shown in FIG. 23.
Figure 26:
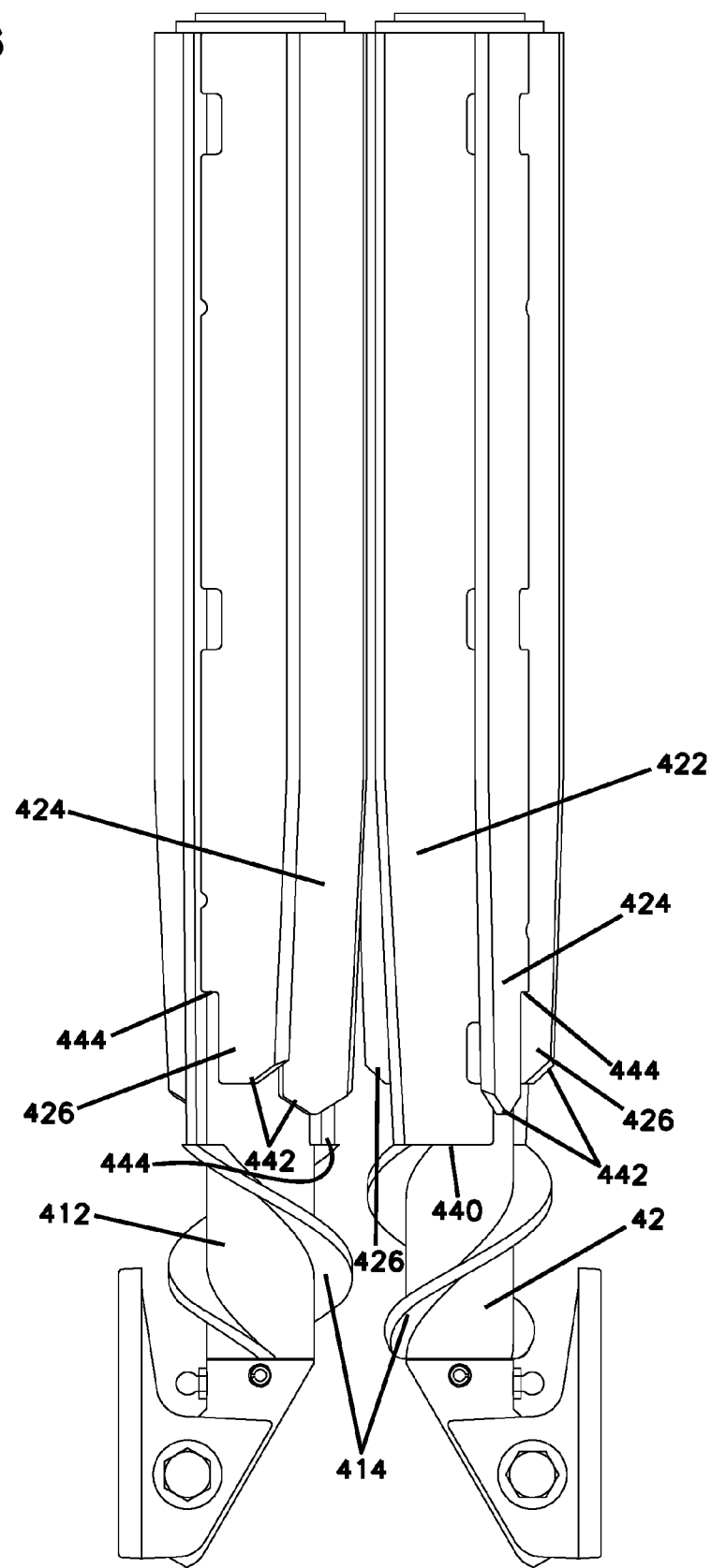
FIG. 26 is a top plan view of the pair of stalk rolls shown in FIG. 23.

Flutes or blades 420 extend rearward towards the front of the stalk rolls 400 and extend radially outward at an oblique angle to the outer surface of the center tube 406 toward the direction of rotation. The flutes 420 on the left stalk roll 402 and the right stalk roll 404 extend in opposite directions to one another and intermesh as shown in FIGS. 23 and 24. In the embodiment shown in FIGS. 22-26, each of the stalk rolls 402 and 404 include six flutes 420. The flutes 420 are configured as first flutes 422 having a first length extending from the rear of the stalk roll 400 towards the front of the stalk rolls. The flutes 422 include a flat leading edge 440. Flutes 424 extend forward from the rear of the stalk rolls 400 at a distance less than the length of the flutes 422. The flutes 424 include a pointed leading edge 442. Third flutes 426 extend even a shorter distance forward than flutes 422 and 424. The flutes 426 also include a pointed leading edge 442. Moreover, notches 444 may extend along the surface of the center tube 406 rearward from the leading edge of the flutes 424 and 426. Each of the flutes 420 also has its outer periphery forming a knife edge 430.

The configuration of the flutes 422, 424 and 426 provides a progressive feed profile that creates a stepped engagement of the stalks to enter the area between the pair of stalk rolls. This configuration achieves superior feeding and processing of the corn stalks with less plugging while also achieving a shorter overall length for the stalk rolls 400. This provides for a more compact and lightweight design for the harvester or combine head.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:
1. A corn stalk roll assembly, comprising:
a first stalk roll;
a second stalk roll aligned substantially parallel to the first stalk roll and rotating in an opposite direction than the first stalk roll;
each of the stalk rolls comprising:
a core having a longitudinal direction;
eight longitudinally extending and radially outward protruding blades spaced about a periphery of the core and extending along the core at an oblique angle to the core, including two first blades having a first length and a flat leading edge, two second blades having the first length and a pointed leading edge, and four third blades having a second length less than the first length, the third blades being spaced alternately with the first and second blades about a periphery of the core; and
an impeller portion proximate a first end of each of the stalk rolls, the impeller of the first stalk roll spiraling in a first direction and the impeller of the second stalk roll spiraling in a second direction opposite the first direction;
the blades of the first stalk roll extending radially outward and slanting toward a first rotation direction and the blades of the second stalk roll extending radially outward and slanting toward a second rotation direction opposite to the first rotation direction;
the stalk rolls being aligned so the blades of the first stalk roll are interposed alternately with the blades of the second stalk roll in an area between the first stalk roll and the second stalk roll.
2. The stalk roll assembly according to claim 1, wherein each of the second blades includes notches formed in an end proximate the impeller portion.
3. The stalk roll assembly according to claim 1, wherein the core comprises a tube.
4. The stalk roll assembly according to claim 3, wherein the blades attach about a periphery of the tube.
5. The stalk roll assembly according to claim 1, wherein the impeller portion includes a helical vane.
6. The stalk roll assembly according to claim 1, wherein the blades of the first stalk roll extend obliquely to an outer surface of the first stalk roll and the wherein the blades of the second stalk roll extend obliquely to an outer surface of the second stalk roll.
7. A corn stalk roll, comprising:
a core having a longitudinal direction;
eight longitudinally extending and radially outward protruding blades spaced about a periphery of the core and extending along the core at an oblique angle to the core, including four first blades having a first length including two first blades having a flat leading edge and two first blades having a pointed leading edge; and four second blades having a second length less than the first length, the first and second blades spaced alternately about a periphery of the core; and
an impeller portion proximate a first end of the stalk roll.
8. The stalk roll according to claim 7, wherein each of the second blades includes notches formed in an end proximate the impeller portion.
9. The stalk roll according to claim 7, wherein the core comprises a tube.
10. The stalk roll according to claim 9, wherein the blades attach about a periphery of the tube.
11. The stalk roll according to claim 7, wherein the impeller portion includes a helical vane.
12. The stalk roll according to claim 7, wherein the blades extend obliquely to an outer surface of the stalk roll.
13. A harvester, comprising:
a body;
an engine;
a cab mounted to the body;
a corn head mounted to a front of the body, the head comprising:
an auger;
a plurality of row separators;
a plurality of gathering assemblies;
a plurality of ear removal devices;
a plurality of pairs of stalk rolls, each stalk roll comprising:
a first stalk roll;
a second stalk roll aligned substantially parallel to the first stalk roll and rotating in an opposite direction than the first stalk roll;
each of the stalk rolls comprising:
a core having a longitudinal direction;
eight longitudinally extending and radially outward protruding blades spaced about a periphery of the core and extending along the core at an oblique angle to the core, including four first blades having a first length including two first blades having a flat leading edge and two first blades having a pointed leading edge; and four second blades having a second length less than the first length, the first and second blades spaced alternately about a periphery of the core; and
an impeller portion proximate a first end of each of the stalk rolls, the impeller of the first stalk roll spiraling in a first direction and the impeller of the second stalk roll spiraling in a second direction opposite the first direction;
the blades of the first stalk roll extending radially outward and slanting toward a first rotation direction and the blades of the second stalk roll extending radially outward and slanting toward a second rotation direction opposite to the first rotation direction;
the stalk rolls being aligned so the blades of the first stalk roll are interposed alternately with the blades of the second stalk roll in an area between the first stalk roll and the second stalk roll.
14. A harvester according to claim 13, wherein the harvester comprises a combine.
15. A harvester according to claim 13, wherein the blades of the first stalk roll extend obliquely to an outer surface of the first stalk roll and the wherein the blades of the second stalk roll extend obliquely to an outer surface of the second stalk roll.
16. A combine, comprising:
a body;
an engine;
a cab mounted to the body;
a threshing assembly;
a corn head mounted to a front of the body, the head comprising:
an auger;
a plurality of row separators;
a plurality of gathering assemblies;
a plurality of ear removal devices;
a plurality of pairs of stalk rolls, each stalk roll comprising:

a first stalk roll;
a second stalk roll aligned substantially parallel to the first stalk roll and rotating in an opposite direction than the first stalk roll;
each of the stalk rolls comprising:
   a core having a longitudinal direction;
   eight longitudinally extending and radially outward protruding blades spaced about a periphery of the core and extending along the core at an oblique angle to the core, including four first blades having a first length with two of the first blades having a flat leading edge and two of the first blades having a pointed leading edge; and four second blades having a second length less than the first length, the first and second blades spaced alternately about a periphery of the core; and
   an impeller portion proximate a first end of each of the stalk rolls, the impeller of the first stalk roll spiraling in a first direction and the impeller of the second stalk roll spiraling in a second direction opposite the first direction;
   the blades of the first stalk roll extending radially outward and slanting toward a first rotation direction and the blades of the second stalk roll extending radially outward and slanting toward a second rotation direction opposite to the first rotation direction;
   the stalk rolls being aligned so the blades of the first stalk roll are interposed alternately with the blades of the second stalk roll in an area between the first stalk roll and the second stalk roll.

* * * * *